United States Patent [19]

Saijo et al.

[11] Patent Number: 4,903,073
[45] Date of Patent: Feb. 20, 1990

[54] IMAGE PROJECTING APPARATUS WITH MARGIN DETECT MEANS

[75] Inventors: Takao Saijo; Masafumi Fujita; Takanori Saitoh, all of Osaka, Japan

[73] Assignee: Minolta Camera Kabushiki Kaisha, Osaka, Japan

[21] Appl. No.: 346,285

[22] Filed: May 1, 1989

Related U.S. Application Data

[63] Continuation of Ser. No. 176,291, Mar. 31, 1988, abandoned.

[30] Foreign Application Priority Data

| Mar. 31, 1987 | [JP] | Japan | 62-79999 |
| Mar. 31, 1987 | [JP] | Japan | 62-80000 |
| Mar. 31, 1987 | [JP] | Japan | 62-80001 |
| Aug. 21, 1987 | [JP] | Japan | 62-207861 |

[51] Int. Cl.4 .................. G03B 27/52; G03B 13/28; G03B 23/12
[52] U.S. Cl. .................. 355/41; 353/26 A; 355/45
[58] Field of Search .............. 355/41, 43, 45, 66, 355/68; 353/25, 26 R, 26 A

[56] References Cited

U.S. PATENT DOCUMENTS

| 3,740,136 | 6/1973 | Maloney et al. | 355/45 X |
| 4,435,076 | 3/1984 | Tatsunosuke | 355/41 |
| 4,453,823 | 6/1984 | Sugita et al. | 355/50 |
| 4,660,965 | 4/1987 | Matsumoto | 355/41 |
| 4,693,591 | 9/1987 | Saijo et al. | 355/41 |
| 4,745,489 | 5/1988 | Kashiwagi et al. | 355/41 X |

FOREIGN PATENT DOCUMENTS 59-143138 8/1984 Japan .

Primary Examiner—Richard A. Wintercorn
Attorney, Agent, or Firm—Burns, Doane, Swecker & Mathis

[57] ABSTRACT

An image projecting apparatus using a microfilm strip carrying a series of image frames which have a margin area between adjacent two thereof, comprising a viewing screen for displaying an image reproduced from the microfilm strip, reels and motors for driving the microfilm strip to travel along a predetermined path, an optical system for irradiating the microfilm strip with a beam of light, the beam of light being transmitted as an information-carrying beam of light carrying image information detected from the microfilm strip, a projection lens for magnifying the information-carrying light beam and projecting the magnified beam of light onto the viewing screen, a photoelectric margin sensor responsive to at least a portion of the information-carrying light beam for producing an electric signal variable with the quantity of light incident on the photoelectric margin sensor, the photoelectric margin sensor being located off the location at which the information-carrying light beam is to be focussed by the projection lens, and a control circuit responsive to the electric signal from the photoelectric margin sensor for detecting the margin area intervening between any adjacent two of the image frames of the microfilm strip and thereby controlling the reels and motors.

14 Claims, 16 Drawing Sheets

PRIOR-ART

PRIOR-ART

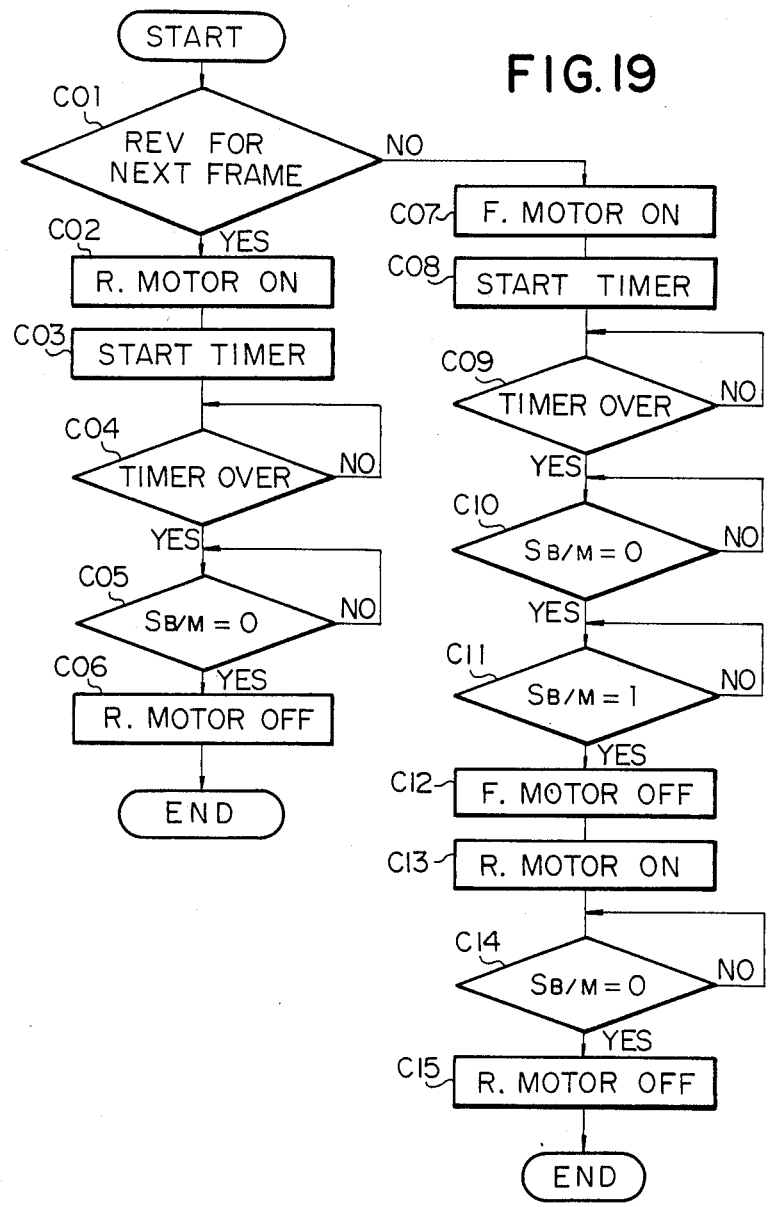

IMAGE PROJECTING APPARATUS WITH MARGIN DETECT MEANS

FIELD OF THE INVENTION

The present invention relates to an image projecting apparatus such as typically a microfilm reader-printer apparatus and, more particularly, to a microfilm reader-printer apparatus or other form of image projecting apparatus incorporating margin detect means adapted to detect margin areas between adjacent image areas or frames arranged in a single array as in a microfilm or in two or more arrays or in matrix form as in a microfiche film.

BACKGROUND OF THE INVENTION

A microfilm strip for typical use on a microfilm reader-printer apparatus has recorded thereon a series of image frames arranged at certain intervals longitudinally of the microfilm strip. To provide easy and fast access to such image frames during reading mode of operation of the apparatus, the microfilm strip further has appropriate identification marks or indices respectively allocated to the individual image frames. Such frame identification marks or indices are commonly called "blip marks" and are indicative of the locations of the respectively associated image frames on the microfilm strip. Any desired image frame can be retrieved out of the image frames of the microfilm strip through detection of the blip mark allocated to the particular image frame with the microfilm strip driven for movement with respect to the optical system of the apparatus.

Not all of the microfilm strips presently available are however furnished with such blip marks or any other form of frame identification marks or indices. Microfilm strips devoid of such marks or indices include 35-mm rolled microfilms and some of 16-mm rolls microfilms, as well known in the art. Where such a microfilm strip used on a microfilm reader-printer apparatus, it is required to retrieve a desired image frame through direct detection of the image frames until the particular image frame is accessed. The most basic manner of retrieving the desired image frame is to drive the microfilm strip for forward or backward movement by manual operation while viewing the images reproduced successively on the viewing screen of the apparatus until the desired image frame is reached on the screen. This manner of retrieval relies on the operator's viewing of the viewing screen and requires the operator to concentrate his attention on the viewing screen while manually controlling the movement of the microfilm strip. In addition, time-consuming consuming adjustment and re-adjustment efforts will also be necessitated for the operator so that the desired image frame which has been successfully accessed is correctly reproduced within a prescribed area of the viewing screen.

Another manner of retrieving a desired image frame from a microfilm strip is taught in U.S. Pat. No. 4,453,823 in which is disclosed a microfilm reader-printer apparatus provided with means to detect the margin areas between the adjacent image frames of a microfilm strip. The margin detect means is located close to the path along which a microfilm strip is to travel through the optical system of the apparatus and includes a margin sensor or sensors located in the path of the light which has been transmitted through the microfilm strip. Any desired one of the image frames on the microfilm strip is to be retrieved through detection of the margin areas between successive image frames by the margin detect means thus arranged. A modified version of such margin detect means is known which includes a margin sensor or sensors located in proximity to the location where the beam of light to be incident on the viewing screen of the apparatus is to be focussed.

Frequently used on a microfilm reader-printer apparatus are negative films rather than positive films for some practical reasons which are well known in the art. A negative microfilm has transparent image and margin areas and opaque background areas for each image frame of the film. In response to the transparent image and margin areas of such a negative microfilm strip, the prior-art margin detect means will produce output signals which are such that the signal produced responsive to the image area is close to or may be even equal in signal level to the signal produced responsive to the margin areas. It will be extremely difficult to have one of such nearly equal signal levels correctly discriminated from the other in a signal processing circuit. The signal processing circuit may therefore frequently fail to correctly recognize the signal from the margin detect means so that extremely exacting design considerations will be required to design and organize the sensors implementing the margin detect means and the signal processing circuit to operate on the signals from such sensors.

The present invention contemplates elimination of these and other problems which have thus far been inherent in an image projecting apparatus using prior-art margin detect means of the described natures. Such an object is to be accomplished on the discovery that all the described problems inherent in the prior-art margin detect means result from the arrangement in which the margin detect means is located close to the path of travel of the microfilm strip or in proximity to the location or point at which the beam of light to be finally incident on the viewing screen is to be focussed.

SUMMARY OF THE INVENTION

In accordance with the present invention, there is provided an image projecting apparatus using a microfilm strip as an image-carrying medium carrying a series of image frames which have a margin area between adjacent two thereof, comprising (a) a viewing screen for displaying an image reproduced from the microfilm strip, (b) drive means for driving the microfilm strip to travel along a predetermined path, (c) means for irradiating the microfilm strip with a beam of light, the beam of light being transmitted as an information-carrying beam of light carrying image information detected from the microfilm strip, (d) a projection lens for magnifying the information-carrying light beam and projecting the magnified beam of light onto the viewing screen, (e) photoelectric transducer means responsive to at least a portion of the information-carrying light beam for producing an electric signal variable with the quantity of light incident on the photoelectric transducer means, the photoelectric transducer means being located off the location at which the information-carrying light beam is to be focussed by the projection lens, and (f) control means responsive to the electric signal from the photoelectric transducer means for detecting the margin area intervening between any adjacent two of the image frames of the microfilm strip and thereby controlling the drive means.

In accordance with another outstanding aspect of the present invention, there is provided an image projecting apparatus using a microfilm strip as an image-carrying medium carrying a series of image frames which have a margin area between adjacent two thereof, comprising (a) a viewing screen for displaying an image reproduced from the microfilm strip, (b) drive means for driving the microfilm strip to travel along a predetermined path, (c) means for irradiating the microfilm strip with a beam of light, the beam of light being transmitted as an information-carrying beam of light carrying image information detected from the microfilm strip, (d) a projection lens for magnifying the information-carrying light beam and projecting the magnified beam of light onto the viewing screen, (e) photoelectric transducer means responsive to at least a portion of the information-carrying light beam for producing an electric signal variable with the quantity of light incident on the photoelectric transducer means, (f) light conducting means for directing the information-carrying light beam from the projection lens to the photoelectric transducer means, the light conducting means comprising light-dispersive reflector means for dispersing the beam of light from the projection lens and directing the dispersed light toward the photoelectric transducer means, and (g) control means responsive to the electric signal from the photoelectric transducer means for detecting the margin area intervening between any adjacent two of the image frames of the microfilm strip and thereby controlling the drive means.

In accordance with still another outstanding aspect of the present invention, there is provided an image projecting apparatus using a microfilm strip as an image-carrying medium carrying a series of image frames which have a margin area between adjacent two thereof, comprising (a) a viewing screen for displaying an image reproduced from the microfilm strip, (b) drive means for driving the microfilm strip to travel along a predetermined path, (c) means for irradiating the microfilm strip with a beam of light, the beam of light being transmitted as an information-carrying beam of light carrying image information detected from the microfilm strip, (d) a projection lens for magnifying the information-carrying light beam and projecting the magnified beam of light onto the viewing screen, (e) photoelectric transducer means responsive to at least a portion of the information-carrying light beam for producing an electric signal variable with the quantity of light incident on the photoelectric transducer means, (f) light conducting means for directing the information-carrying light beam from the projection lens to the photoelectric transducer means, the light conducting means comprising light-dispersive light transmitting means for dispersing the beam of light from the projection lens and passing the dispersed light toward the photoelectric transducer means, and (g) control means responsive to the electric signal from the photoelectric transducer means for detecting the margin area intervening between any adjacent two of the image frames of the microfilm strip and thereby controlling the drive means.

In accordance with still another outstanding aspect of the present invention, there is provided an image projecting apparatus using a microfilm strip as an image-carrying medium carrying a series of image frames which have a margin area between adjacent two thereof, comprising (a) a viewing screen for displaying an image reproduced from the microfilm strip, (b) drive means for driving the microfilm strip to travel along a predetermined path, (c) means for irradiating the microfilm strip with a beam of light, the beam of light being transmitted as an information-carrying beam of light carrying image information detected from the microfilm strip, (d) a projection lens for magnifying the information-carrying light beam and projecting the magnified beam of light onto the viewing screen, (e) photoelectric transducer means responsive to at least a portion of the information-carrying light beam for producing an electric signal variable with the quantity of light incident on the photoelectric transducer means, (f) light conducting means for directing the information-carrying light beam from the projection lens to the photoelectric transducer means, the light conducting means comprising beam-converging light transmitting means for converging the beam of light from the projection lens and passing the converged light toward the photoelectric transducer means, and (g) control means responsive to the electric signal from the photoelectric transducer means for detecting the margin area intervening between any adjacent two of the image frames of the microfilm strip and thereby controlling the drive means.

BRIEF DESCRIPTION OF THE DRAWINGS

The drawbacks of an image projecting apparatus using prior-art margin detect means and the features and advantages of an apparatus according to the present invention will be more clearly understood from the following description taken in conjunction with the accompanying drawings in which like reference numerals designate similar or corresponding units and elements and in which:

FIG. 19 is a flowchart showing still another preferred routine program which may be predominant over the operation of any of the embodiments of image projecting apparatus according to the present invention;

DESCRIPTION OF THE PRIOR ART

In a prior-art reader-printer apparatus as disclosed in the named U.S. Pat. No. 4,453,823, there is provided means to detect the margin areas between the adjacent image frames on the microfilm strip to be reproduced on the viewing screen of the apparatus. Such margin detect means is located close to the path along which a microfilm strip is to travel through the optical system of the apparatus and includes a margin sensor or sensors located in the path of the light which has been transmitted through the microfilm strip. More specifically, the margin sensor or each of the margin sensors of the prior-art margin detect means is located in proximity to the area over which the microfilm strip is irradiated with light by means of the optical system of the apparatus. Where two or more margin sensors are used, they are spaced apart from each other with respect to the direction of travel of the microfilm strip.

Any desired one of the image frames on the microfilm strip could be retrieved through detection of the margin areas between successive image frames by the margin detect means thus arranged and could be correctly reproduced within a prescribed area of the viewing screen. A known modified version of such margin detect means includes a margin sensor or sensors located in proximity to the point where the beam of light to be incident on the viewing screen of the apparatus is to be focussed.

Figure 1A:
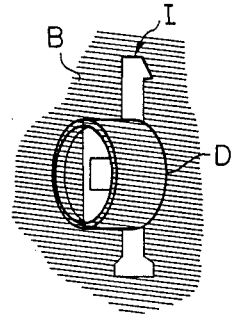
FIG. 1A is a fragmentary perspective view showing an imaginary image which may be detected by a margin sensor forming part of known margin detect means when a transparent image area of an image frame of a negative microfilm strip is to be reproduced.

Assume now that a negative microfilm strip is to be used on a microfilm reader-printer apparatus incorporating such margin detect means and that an image frame of the negative microfilm strip contains an image of the numeral "1" (one). The image of the numeral "1" will occur in the form a transparent pattern having a relatively broad vertical portion. If the transparent image of the numeral "1" on the microfilm strip S were reproduced on a plane containing the photoelectric transducer element of the sensor D, there would be formed a corresponding image I on the particular plane as shown in FIG. 1A. It may be herein noted that the image I thus reproduced has a distinct, clear-cut contour. This is because of the fact that the sensor D is located is so that the distance between the sensor and the microfilm strip along the path of light from the microfilm strip to the sensor is equal to the distance which light is to travel from the microfilm strip to the viewing screen on which the images on the microfilm strip are to be focussed.

Figure 1B:
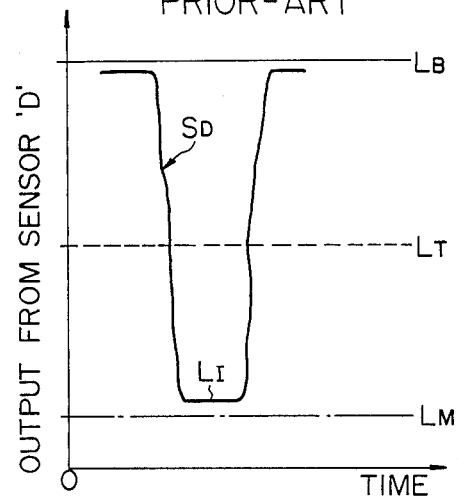
FIG. 1B is a graph showing the waveform of a signal produced by the margin sensor of the prior-art margin detect means in response to a beam of light carrying the image illustrated in FIG. 1B.

In response to an information-carrying beam of light produced from the image frame containing such an image "1", a margin sensor D forming part of the prior-art margin detect means will produce an output signal $S_D$ which varies as shown in FIG. 1B. In FIG. 1B, a horizontal full line indicates the level $L_B$ of the signal $S_D$ produced in response to the dark background area (denoted by B in FIG. 1A) surrounding the transparent image "1". A dot-and-dash line indicates the level $L_M$ of the signal $S_D$ to be produced in response to the transparent margin area intervening between adjacent two of the image frames of the microfilm strip. Further indicated by a broken line is a predetermined threshold level $L_T$ intervening between the levels $L_B$ and $L_M$.

As will be seen from FIG. 1B, the signal $S_D$ produced by the margin sensor D in response to the transparent image "1" has a level $L_I$ so close to or in a certain case even equal to the level $L_M$ of the signal $S_D$ produced in response to the transparent margin area between adjacent two of the image frames. It will be extremely difficult to have one of such levels $L_I$ and $L_M$ correctly discriminated from the other in a signal processing circuit operating on the basis of the signal $S_D$ supplied from the margin detect means including the margin sensor D. This may result in frequent failure of the signal processing circuit in correctly recognizing the signal $S_D$ from the margin detect means and/or may require extremely stringent design considerations in designing and organizing the margin sensors and signal processing circuit merely for the detection of margin areas of a microfilm strip.

An approach to solving the problem resulting from the use of the prior-art margin detect means may be to use a larger photosensitive area for the margin sensor D as has been attempted in some advanced versions of the detect means. Provision of such a larger photoelectric area of the margin sensor D will contribute to improvement in the signal-to-noise (S/N) ratio of the signal to be output from the sensor D and will thus be useful for the prevention of erred recognition of the signal from the margin detect means. This advantage is however usually offset by a significant increase in the production cost of the sensor and a decrease in the accuracy in driving a microfilm strip for movement to a position in which a desired image frame is to be correctly reproduced within the prescribed area of the viewing screen.

DESCRIPTION OF THE PREFERRED EMBODIMENTS

Figure 2:
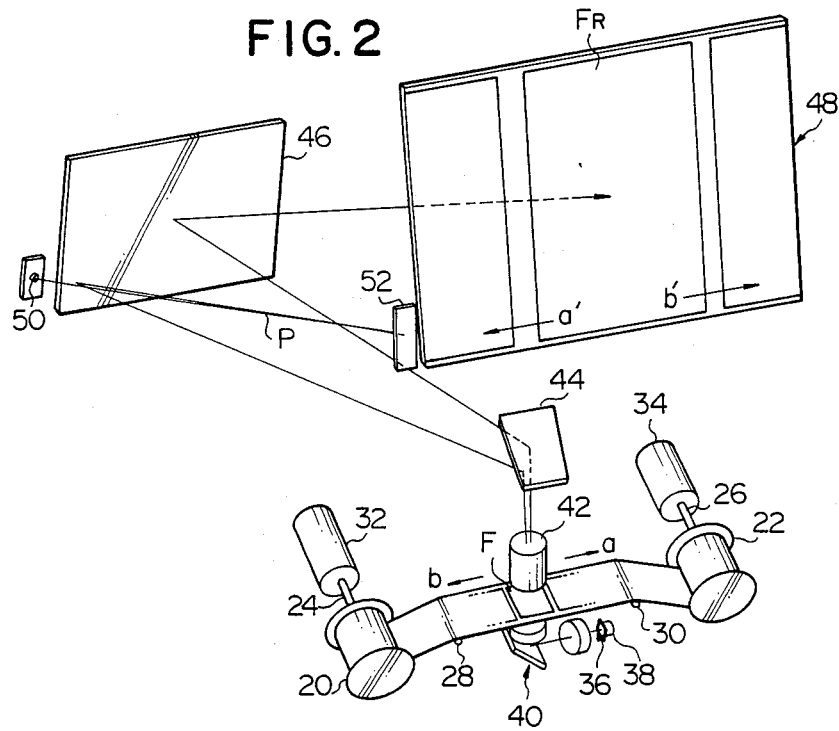
FIG. 2 is a perspective view showing the general mechanical and optical arrangement of a first preferred embodiment of a microfilm reader-printer apparatus representative of an image projecting apparatus to which the present invention appertains.

FIG. 2 shows the mechanical and optical arrangement of a microfilm reader-printer apparatus of a type to which the present invention may appertain. The microfilm readerprinter apparatus herein shown is per se well known in the art and includes first and second reels 20 and 22 having respective drive shafts 24 and 26 spaced apart in parallel from each other. The first reel 20 is a feed reel carrying a continuous length of microfilm strip S in the form of a roll and the second reel 22 is a takeup reel to accept the microfilm strip S passed over from the feed reel. The microfilm strip S which is wound partly on one of the reels 20 and partly on the other reel may be driven to travel in a forward direction from the feed reel toward the takeup reel 22 as indicated by arrow a or in a reverse direction from the takeup reel 22 toward the feed reel as indicated by arrow b. The microfilm strip S thus travelling from the feed reel toward the takeup reel 22 or backwardly from the takeup reel 22 toward the feed reel is guided by means of rollers 28 and 30 which are located intermediate between the reels 20 and 22 as shown.

The feed reel 20 is driven for rotation with its drive shaft 24 coupled to the output shaft of a first reversible motor 32 ($M_R$) and, likewise, the takeup reel 22 is driven for rotation with its drive shaft 26 coupled to the output shaft of a second reversible motor 34 ($M_F$). The first reversible motor 32 implements reverse drive means operative to drive the associated feed reel in a direction in which the microfilm strip S carried on the takeup reel 22 is to be unwound therefrom and paid from the takeup reel 22 toward the feed reel 20. The second reversible motor 34 implements forward drive means operative to drive the associated feed reel 20 in a direction in which the microfilm strip S fed from the takeup reel 22 is to be wound thereon in the form of a roll. Thus, the first reversible motor 32 will be herein referred to as reverse drive motor and the second reversible motor 34 as forward drive motor. As well known in the art, the microfilm strip S has recorded thereon a series of image frames F which are arranged at certain intervals from one another longitudinally of the microfilm strip S.

The guide rollers 28 and 30 are located so that the microfilm strip S to travel from one of the reels 20 and 22 toward the other is enabled to pass through a path of light with which any of the image frames F may be irradiated. Thus, the microfilm reader-printer apparatus further comprises an optical system which comprises a source of light 36 and a reflector mirror 38 located in conjunction with the source of light 36 to reflect a beam of light emanating from the source 34. The beam of light reflected from the reflector mirror 38 is directed toward the travelling path of the microfilm strip S between the guide rollers 28 and 30 by means of a suitable optical stage 40. The optical stage 40 is herein shown by way of example as including a set of condenser lenses to pass therethrough the beam of light reflected from the reflector mirror 38 and an intermediate reflector mirror to re-direct the beam of light toward the travelling path of the microfilm strip S. The optical arrangement 40 further includes a set of condenser lenses through which the beam of light reflected from the intermediate reflector mirror is incident on and transmitted through the microfilm strip S extending between the guide rollers 28 and 30.

The beam of light thus transmitted through the microfilm strip S and now carrying image information read from any image frame F of the microfilm strip S is passed through a projection lens 42 to a reflector mirror 44. From the reflector mirror 44, the information-carrying beam of light is re-directed to an image projecting reflector mirror 46 and is projected onto a viewing screen 48 positioned at the front end of the housing (not shown) of the apparatus. The projection lens 42 has a focal distance which is selected so that the location or point at which the beam of light directed toward the viewing screen 48 is to be focussed on the inner or rear face of the screen 48.

On the viewing screen 48 is thus reproduced a magnified image $F_R$ of any of the image frames F read from the microfilm strip S. When the microfilm strip S is driven to travel in the direction of arrow a from the reel 20 toward the reel 22 or in the direction of arrow b from the reel 22 toward the reel 20, the magnified image I of the image frame F moves in a direction of arrow a' or in a direction of arrow b', respectively, on the viewing screen 48. The forward drive motor 32 or the reverse drive motor 34 is actuated selectively in response to a control signal supplied from a control panel (not shown) forming part of the apparatus so that any desired one of the image frames F on the microfilm strip S may be displayed on the viewing screen 48.

The mechanical and optical arrangement of the microfilm reader-printer apparatus as hereinbefore described with reference to FIG. 2 is per se well known in the art and may be modified in any desired manners insofar as the intent of the present invention as will be clarified as the description proceeds is maintained and reasonably exploitable.

In an image projecting apparatus according to the present invention is further provided margin detect means adapted to detect margin areas between adjacent image areas or frames arranged in a single array as in a microfilm or in two or more arrays or in matrix form as in a microfiche film. In the microfilm reader-printer apparatus illustrated in FIG. 2, there is thus provided a margin sensor 50 opposed to a reflector mirror 52. Typically, the margin sensor 50 is located in the neighborhood of one side end of the image projecting reflector mirror 46 and the reflector mirror 52 located in the neighborhood of the corresponding side end of the viewing screen 48 as shown. Thus, the margin sensor 50 receives a lateral end portion P of the beam of light to be incident on the viewing screen 48. In the embodiment of an apparatus according to the present invention, the margin detect means implemented by the combination of the margin sensor 50 and the associated reflector mirror 52 is located remote not only from the path of travel of the microfilm strip S but also from the location or point at which the beam of light to be finally incident on the viewing screen 48 is to be focussed. Furthermore, the photoelectric transducer element 54 forming part of the margin sensor 50 is located off the location at which the information-carrying beam passed through the projection lens 42 to be focused by the lens 42. Such location of photoelectric transducer element 54 is preferably such that the distance between the sensor 50 and the microfilm strip S along the path of light from the microfilm strip S to the sensor 50 is more than 3 per cent smaller or larger than the total distance which light is to travel from the microfilm strip S to the viewing screen 48. In the arrangement shown in FIG. 2, the distance between the sensor 50 and the microfilm strip S along the path of light is assumed to be more than 3 per cent longer than the total distance which light is to travel from the microfilm strip S to the viewing screen 48.

Figure 3:
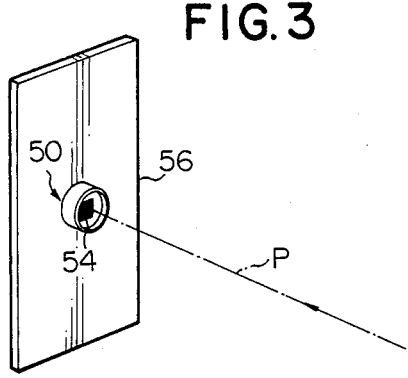
FIG. 3 is a perspective view showing the arrangement of a margin sensor and an associated reflector mirror which implement the margin detect means included in the microfilm reader-printer apparatus illustrated in FIG. 2.
Figure 4:
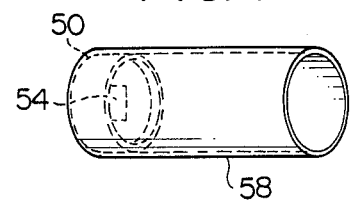
FIG. 4 is a perspective view showing a shield member which may further form part of the margin detect means included in the microfilm reader-printer apparatus illustrated in FIG. 2.

The portion P of the beam of light thus received by the mirror 52 is re-directed to the margin sensor 50. In response to such a portion P of the beam of light, the margin sensor 50 produces an output signal which may be indicative of a transparent margin area between successive two of the image frames F read from the microfilm strip S or an opaque image area of any of the image frames F. As shown in FIG. 3, the margin sensor 50 comprises a photoelectric transducer element 54 such as a photodiode mounted on an insulating support plate 56. In order that the light reflected from the reflector mirror 52 be conducted to the photoelectric transuducer element 54 with an increased concentration, the sensor 50 may be provided with a hollow cylindrical shield member 58 which is open at one end toward the reflector mirror 52 and at the other to the transuducer element 54, as shown in FIG. 4. The shield member 58 is useful for preventing extraneous light from reaching the photoelectric transuducer element 54, such extraneous light being the light reflected from the viewing screen 48 or the light reflected from any reflective surfaces located within the apparatus.

Figure 5A:
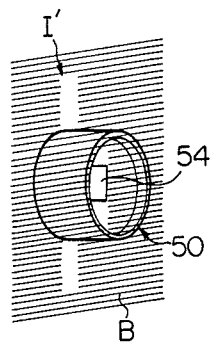
FIG. 5 is a view similar to FIG. 1A but now shows an imaginary image which may be detected by a margin sensor forming part of the margin detect means included in the microfilm reader-printer apparatus illustrated in FIG. 2.
FIG. 5B is a graph showing the waveform of a signal produced by the margin sensor in the apparatus of FIG. 2 in response to a beam of light carrying the image illustrated in FIG. 5B.

It is now assumed that a negative microfilm strip is used on the microfilm reader-printer apparatus incorporating margin detect means 50/52 arranged as hereinbefore described and that an image frame of the negative microfilm strip contains an image of the numeral "1" as previously discussed in connection with the prior-art margin detect means. As noted with reference to FIG. 1A, the image of the numeral "1" occurs on the image frame in the form a transparent pattern having a relatively broad vertical portion. If the transparent image of the numeral "1" on the microfilm strip S were reproduced on a plane containing the transducer element 54 of the sensor 50, there would be formed a corresponding image I' on the particular plane as shown in FIG. 5A.

Figure 5B:
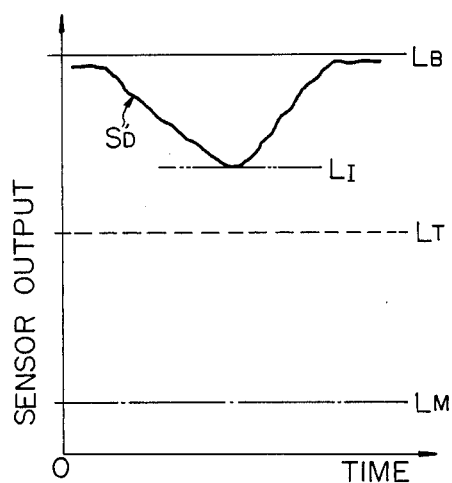

In response to an information-carrying beam of light produced from the image frame containing such an image "1", the margin sensor 50 will produce an output signal $S_D$ which varies as shown in FIG. 5B. In FIG. 5B are also indicated the level $L_B$ of the signal $S_D$ produced in response to the dark background area B surrounding the transparent image "1", the level $L_I$ of the signal $S_D$ produced in response to the bright area defined by the transparent image "1" and level $L_M$ of the signal $S_D$ to be produced by the margin sensor 50 in response to the transparent margin area intervening between adjacent two of the image frames of the microfilm strip.

As noted previously, the location of the photoelectric transducer element 54 of the margin sensor 50 in the shown arrangement is such that the distance between the sensor 50 and the microfilm strip S along the path of light is more than 3 per cent longer than the total distance which light is to travel from the microfilm strip S to the viewing screen 48. Due to such arrangement of the sensor 50 with respect to the location where the beam of light to be finally incident on the viewing screen 48 is to be focussed, the portion P of the beam of light bearing the transparent image of the numeral "1" is more or less dispersed when the beam portion P is incident on the photoelectric transducer element 54. If the transparent image of the numeral "1" on the microfilm strip S were reproduced on the plane containing the photoelectric transducer element 54, the reproduced image would have an indistinct and rather obscure contour as will be seen from FIG. 5A. To enhance the dispersion of the light reflected from the reflector mirror 52, the reflector mirror 52 which forms part of the margin detect means of the apparatus embodying the present invention may be processed to have a mat reflective surface.

FIG. 5B shows an example of the waveform of the signal $S_D$ which may be produced by the margin sensor 50 in response to the image having such an indistinct and obscure contour. As will be seen from this waveform, the lowest level $L_I$ of the signal $S_D$ produced in response to the transparent image "1" is not only far higher than the level $L_M$ of the signal $S_D$ produced in response to the transparent margin area between adjacent two of the image frames but sufficiently higher than the threshold level $L_T$. Such a level $L_I$ could be easily and accurately discriminated from the level $L_M$ by means of a signal processing circuit operating on the basis of the signal $S_D$ supplied from the margin sensor 50. This will enable the signal processing circuit to correctly recognize the signal $S_D$ from the margin detect means and/or and will contribute to elimination of the stringent design considerations which have been indispensable in designing and organizing the margin sensors and signal processing circuit.

Figure 6:
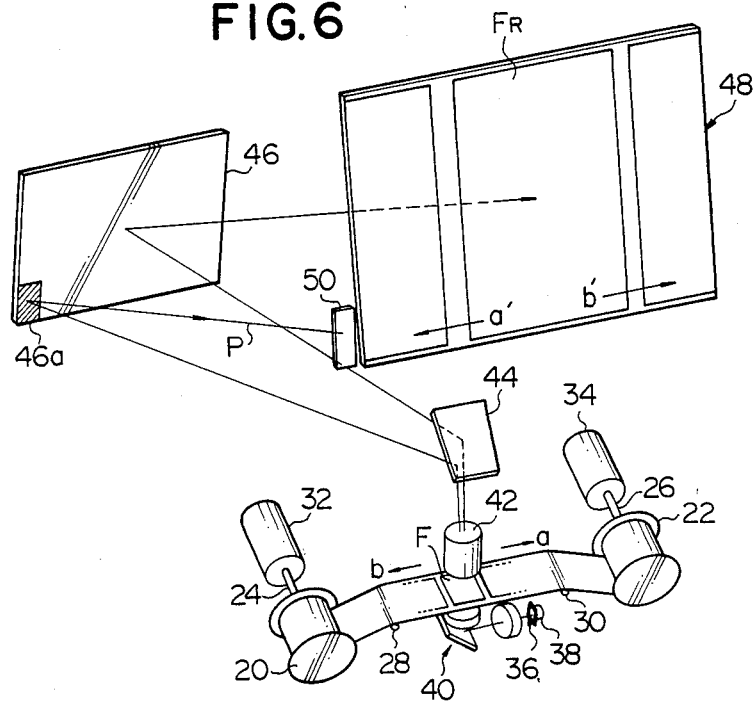
FIG. 6 is a perspective view showing the general mechanical and optical arrangement of a second preferred embodiment of a microfilm reader-printer apparatus representative of an image projecting apparatus to which the present invention appertains.
Figure 8:
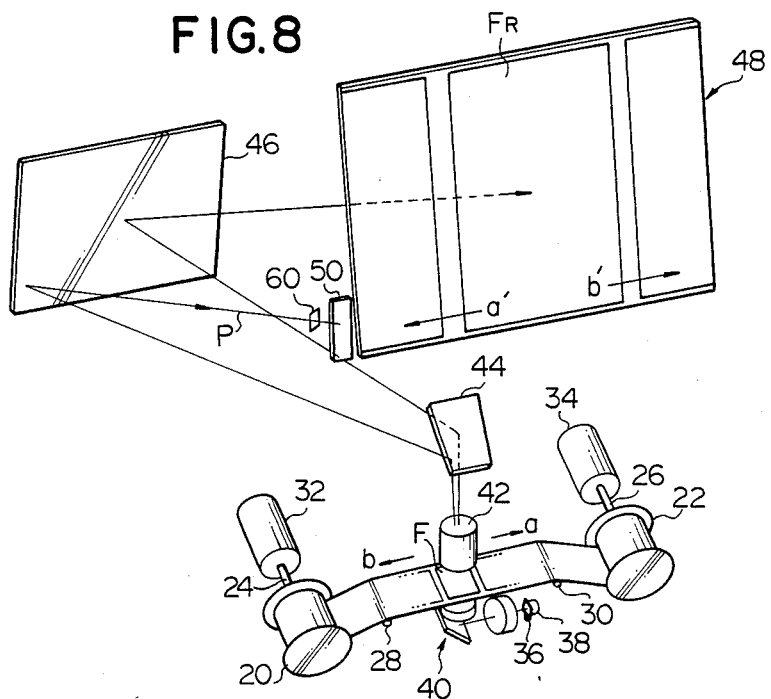
FIG. 8 is a perspective view showing the general mechanical and optical arrangement of a third preferred embodiment of a microfilm reader-printer apparatus representative of an image projecting apparatus to which the present invention appertains.
Figure 10:
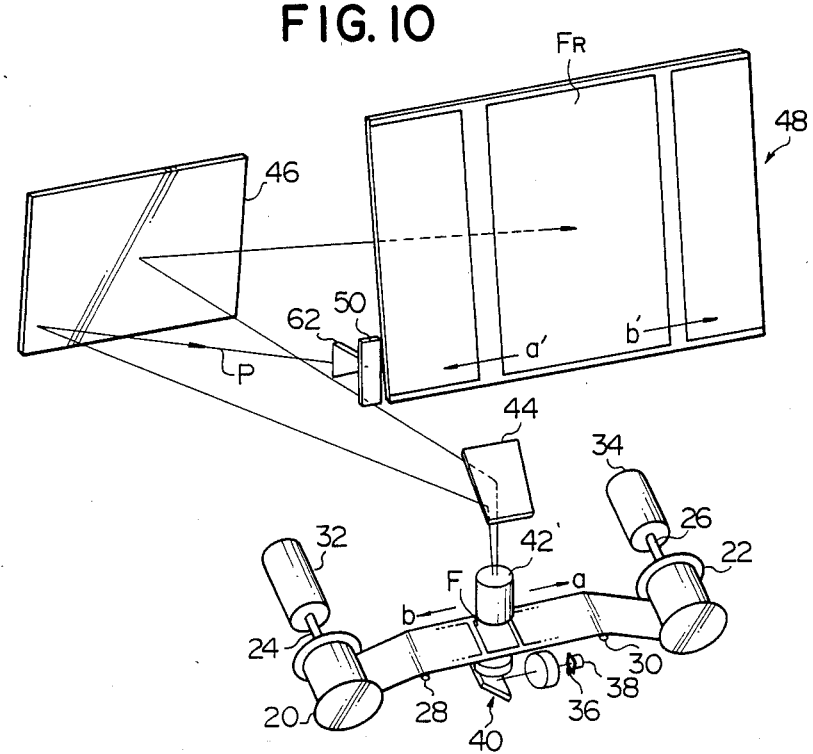
FIG. 10 is a perspective view showing the general mechanical and optical arrangement of a fourth preferred embodiment of a microfilm reader-printer apparatus representative of an image projecting apparatus to which the present invention appertains.

FIGS. 6, 8 and 10 show some modifications of the microfilm reader-printer apparatus hereinbefore described with reference to FIG. 2, the mechanical and optical arrangement of each reader-printer apparatus herein shown being per se similar to that of the microfilm reader-printer apparatus described with reference to FIG. 2.

In the embodiment shown in FIG. 6, the margin detect means comprises a margin sensor 50 located in the neighborhood of one side end of the viewing screen 48 and a reflector mirror 46a located in the neighborhood of the corresponding side end of the image projecting reflector mirror 46 as shown. Thus, the margin sensor 50 also receives a lateral end portion P of the beam of light to be incident on the viewing screen 48. The reflector mirror 46a of the margin detect means provided in the embodiment shown in FIG. 6 is formed by a roughened portion of the front reflective surface of the mirror 46 as indicated by a hatched area of the mirror 46. Such a roughened portion of the front reflective surface of the image projecting reflector mirror 46 may be formed by sand blasting the particular portion of the reflective surface of the mirror 46.

The photoelectric transducer element 54 forming part of the margin sensor 50 in the embodiments herein shown is also located off the location at which the information-carrying beam passed through the projection lens 42 to be focused by the lens 42. It will however be apparent that such a location of the photoelectric transducer element 54 is merely by way of example and may thus be varied appropriately if desired.

Figure 7:
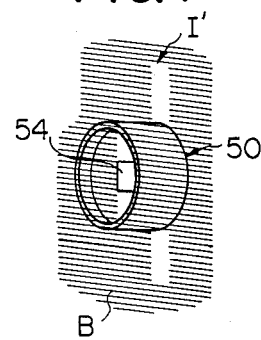
FIG. 7 is a view also similar to FIG. 1A but now shows an imaginary image which may be detected by a margin sensor forming part of the margin detect means included in the microfilm reader-printer apparatus illustrated in FIG. 6.

In FIG. 7 is shown an imaginary image which may be detected by the margin sensor 50 forming part of the margin detect means arranged as above described with reference to FIG. 6. It will be also seen from FIG. 7 that the image of the numeral "1" which might be reproduced on a plane containing the transducer element 54 of the sensor 50 would have an indistinct and obscure contour.

In the embodiment shown in FIG. 8, the margin detect means comprises a margin sensor 50 located in the neighborhood of one side end of the viewing screen 48 and a light transmitter 60 located anterior to the margin sensor 50 in the direction of travel of light toward the viewing screen 48. Thus, the margin sensor 50 of the margin detect means provided in the embodiment herein shown also receives the lateral end portion P of the beam of light to be incident on the viewing screen 48. The lateral end portion P of the beam of light reflected from the projecting reflector mirror 46 is transmitted through the light transmitter 60 before the beam reaches the margin sensor 50. The light transmitter 60 is of the type adapted to disperse the light transmitted therethrough and may have a mat surface or surfaces. If desired, the light transmitted through the light transmitter 60 may be directed to the margin sensor 50 via a reflector mirror located to re-direct light from the light transmitter 60 toward the sensor 50, though not shown in the drawings.

The photoelectric transducer element 54 forming part of the margin sensor 50 in the embodiments herein shown is also located at the location at which the information-carrying beam passed through the projection lens 42 to be focused by the lens 42. Such a location of the transducer element 54 is merely by way of example and may be otherwise determined if desired.

Figure 9:
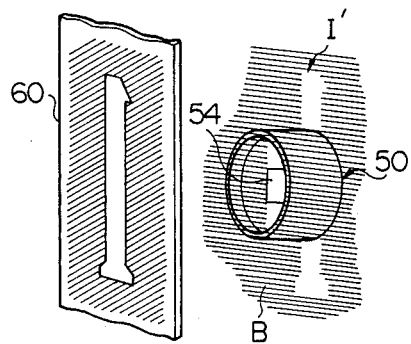
FIG. 9 is a view also similar to FIG. 1A but now shows an imaginary image which may be detected by a margin sensor forming part of the margin detect means included in the microfilm apparatus illustrated in FIG. 6.

In FIG. 9 is shown an imaginary image which may be detected by the margin sensor 50 forming part of the margin detect means arranged as above described with reference to FIG. 8. It will be also seen from FIG. 7 that the image of the numeral "1" which might be reproduced on a plane containing the transducer element 54 of the sensor 50 would have an indistinct and obscure contour. off In the embodiment shown in FIG. 10, the margin detect means comprises a margin sensor 50 located in the neighborhood of one side end of the viewing screen 48 and a beam-converging light transmitter 62 immediately located anterior to the margin sensor 50 in the direction of travel of light toward the viewing screen 48. Thus, a lateral end portion P of the information-carrying beam of light reflected from the projecting reflector mirror 46 is admitted into the beam-converging light transmitter 62 before the beam reaches the margin sensor 50. Unlike the margin sensor 50 used in each of the embodiments thus far described, the photoelectric transducer element 54 forming part of the margin sensor 50 in the embodiments herein shown is located at or in close proximity to the location at which the information-carrying beam passed through the projection lens 42 to be focused by the lens 42. Thus, the margin sensor 50 of the margin detect means provided in the embodiment herein shown is preferably located so that the distance between the sensor 50 and the microfilm strip S along the path of light from the microfilm strip S to the sensor 50 is substantially equal to the total distance which light is to travel from the microfilm strip S to the viewing screen 48.

Figure 11:
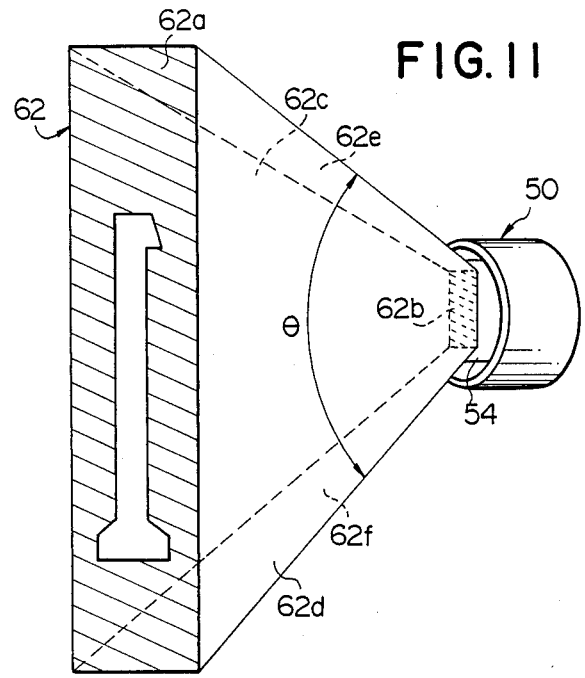
FIG. 11 is a perspective view showing, to an enlarged scale, the construction and arrangement of the margin detect means included in the microfilm reader-printer apparatus illustrated in FIG. 10.
Figure 12:
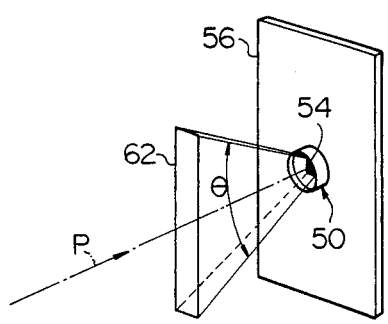
FIG. 12 is a perspective view showing the arrangement of a margin sensor and an associated beam-converging light transmitter which implement the margin detect means included in the microfilm reader-printer apparatus illustrated in FIG. 10.

As will be seen from FIG. 11, the beam-converging light transmitter 62 consists of a transparent or translucent, generally hexahedral member having light inlet and outlet ends and a cross sectional area continuously reduced from the light inlet toward the light outlet end. Thus, the hexahedral member forming the beam-converging light transmitter 62 has enlarged and rediced light inlet and outlet end faces 62a and 62b spaced apart in parallel from each other in a direction in which the portion P of the beam of light reflected from the reflector mirror 46 advances toward the margin sensor 50. The hexahedral member forming the light transmitter 62 further has a pair of trapezoidal side faces 62c and 62d slanting toward each other from the light inlet to the light outlet end of the member, and upper and lower end faces 62e and 62f slanting toward each other from the light inlet end to the light outlet end of the member.

The light inlet end face 62a of the beam-converging light transmitter 62 thus shaped is directed toward the reflector mirror 46 and may measure about 3mm in width and about 20mm in height by way of example.

The area of the light inlet end face 62a may however vary with the sizes of the image elements (such as alphanumerical letters) which may be detected by the sensor 50. The light outlet end face 62b of the transmitter 62 is located in proximity to and directed toward the photoelectric transducer element 54 of the margin sensor 50. The angle between the upper and lower end faces 62e and 62f of the beam-converging light transmitter 62 is preferably selected from a range of from 30 degrees to 120 degrees. To enable the light transmitter 60 to disperse light, the light outlet end face 62b of the transmitter 62 may have a mat surface so that the light to form the image to be detected by the sensor 50 is dispersed before the light reaches the sensor 50.

The configuration of the beam-converging light transmitter 62 herein shown is merely by way of example and, as such, may be varied as desired insofar as the member forming the transmitter 62 has a cross sectional area continuously reduced from the light inlet toward the light outlet end. If desired, the light transmitted through the light transmitter 60 may be directed to the margin sensor 50 via a reflector mirror located to redirect light from the light transmitter 60 toward the sensor 50, though not shown in the drawings. Alternately to the beam-converging light transmitter 62 configured and arranged as above described, a lens appropriately configured and located in conjunction with the margin sensor 50 with respect to the path of the portion P of the beam of light toward the sensor 50.

The portion P of the beam of light reflected from the reflector mirror 46 is admitted into the beam-converging light transmitter 62 and is converged or condensed as the light advances toward the light outlet end of the transmitter 62. The image carried on the portion P of the beam of light is thus reduced and obscured and accordingly has an indistinct and obscure contour when passed through the light outlet face 62b of the transmitter 62 to the margin sensor 50 as will be seen from FIG. 11.

Figure 13:
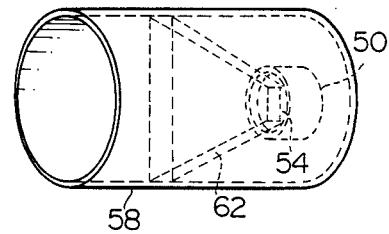
FIG. 13 is a perspective view showing a shield member which may further form part of the margin detect means included in the microfilm reader-printer apparatus illustrated in FIG. 10.

The sensor 50 in the embodiment shown in FIG. 10 may also be provided with a hollow cylindrical shield member 58 which is open at one end toward the reflector mirror 53 and at the other to the transducer element 54, as shown in Fig. 13. In the margin detect means herein shown, the shield member 58 has not only the margin sensor 50 but also the beam-converging light transmitter 62 accommodated therein. As noted previously, the shield member 58 is useful for preventing extraneous light from reaching the photoelectric transducer element 54.

Figure 14:
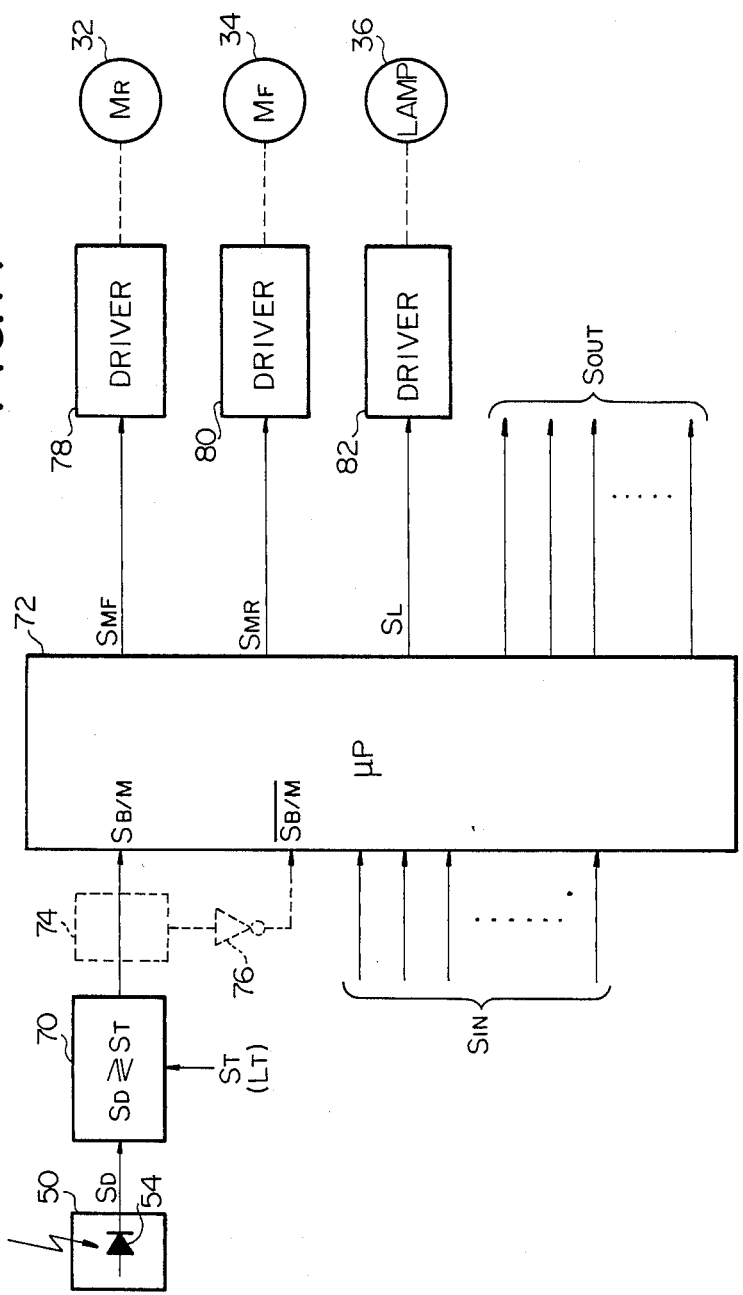
FIG. 14 is a block diagram showing the general circuit arrangement of a preferred example of a signal processing circuit for use with the margin detect means in the apparatus embodying the present invention.

FIG. 14 shows the general circuit arrangement of a preferred example of the signal processing circuit for use with the margin detect means in the apparatus embodying the present invention. As shown, the signal $S_D$ produced by the margin sensor 50 as hereinbefore described is supplied to a comparator circuit 70 and is compared with a reference signal $S_T$ representative of the predetermined threshold level $L_T$ of the signal $S_D$ intervening between the levels $L_B$ and $L_M$ to be produced in response a dark background area and a bright margin area. Thus, the comparator circuit 70 determines that the signal $S_D$ received from the margin sensor 50 is indicative of a bright margin area of an image frame F if the signal $S_D$ is lower than the threshold level $S_T$ and indicative of a dark background area of the image frame F if the signal $S_D$ is higher than the threshold level $S_T$. Such a comparator circuit may be implemented by a switch network including a diode having a threshold level corresponding to the threshold level $S_T$ of the signal $S_D$ or by a combination of an operational amplifier and an analog-to-digital (A/D) converter. A logic "0" or "1" output signal is thus produced as a background/margin discriminate signal $S_{B/M}$ from the comparator circuit 70 depending on the relationship of the input signal $S_D$ to the level $L_B$ or level $L_M$.

The background/margin discriminate signal $S_{B/M}$ of logic "0" or logic "1" state is input to a microprocessor unit 72 which also receives various data and control signals at its input ports commonly designated by $S_{IN}$. If desired, any switch circuit may be provided between the comparator circuit 70 and microprocessor unit 72 as indicated at 74 so that the digital discriminate signal $S_{B/M}$ may be passed directly to the microprocessor unit 72 or transmitted upon inversion by a logic inverter 76 to the microprocessor unit 72. The inverted version ($\overline{S_{B/M}}$) of the signal $S_{B/M}$ may be used for the detection of margin areas of a positive microfilm strip.

In response to the signal $S_{B/M}$ thus supplied from the comparator circuit 70, the microprocessor unit 72 produces control signals $S_{MF}$ and $S_{MR}$ to control the operation of the forward and reverse drive motors 32 and 34, respectively, and a control signal $S_L$ to control the operation of the source of light 36 in the mechanical and optical arrangement of the apparatus. The control signal $S_{M1}$ is supplied to a driver circuit 78 for the forward drive motor 32 ($M_F$) and the control signal $S_{M2}$ supplied to a driver circuit 80 for the reverse drive motor 34 ($M_R$), while the control signal $S_L$ is supplied to a driver circuit 82 for the source of light 36. In response to the control signals $S_{MF}$ and $S_{MR}$ thus supplied to the driver circuits 78 and 80, respectively, the forward and reverse drive motors 32 and 34 are selectively activated or brought to a stop to drive the microfilm strip S for movement to a position in which a desired image frame F is located correctly to the path of light directed from optical stages 40. The microprocessor unit 72 further outputs various control and instruction signals at its output ports commonly designated by $S_{OUT}$.

Description will be hereinafter made in respect of the various aspect of the operation of the microfilm reader-printer apparatus embodying the present invention as has been described with reference to each of FIGS. 2, 6, 8 and 10.

Figure 15:
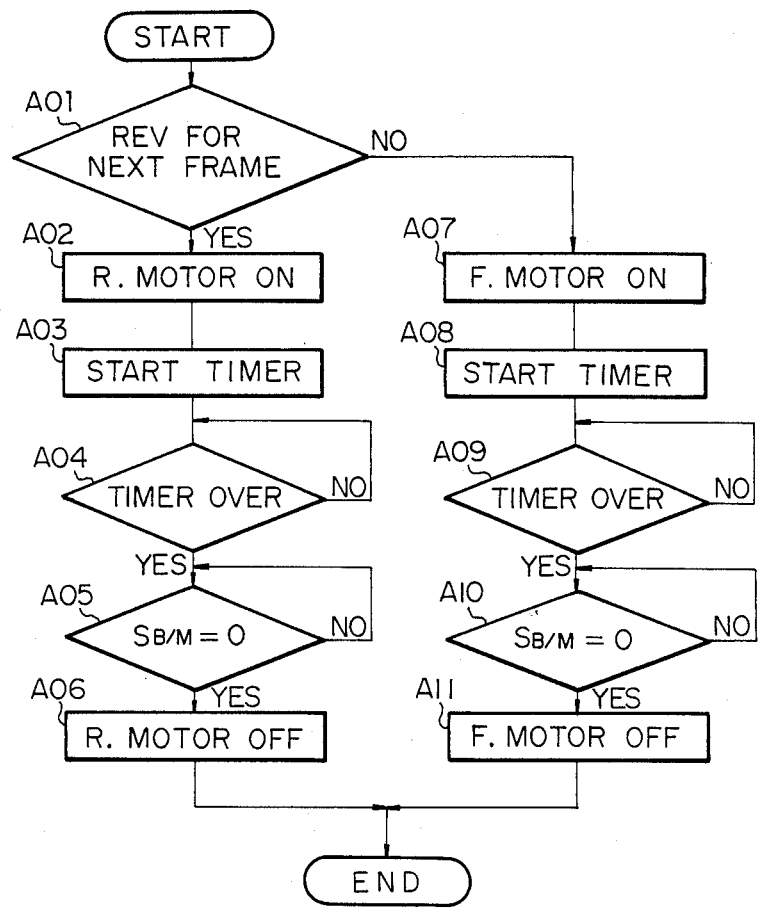
FIG. 15 is a flowchart showing a preferred routine program which may be predominant over the operation of any of the embodiments of image projecting apparatus according to the present invention.
Figure 16A:
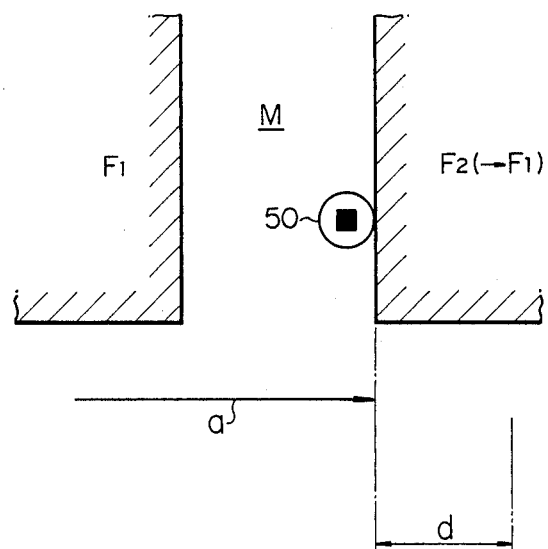
FIGS. 16A and 16B are fragmentary schematic views showing the location which adjacent two image frames of a microfilm strip may have with respect to the margin sensor at the end or beginning of forward and reverse drive cycles of operation, respectively, when the routine program illustrated in FIG. 15 is executed.
Figure 16B:
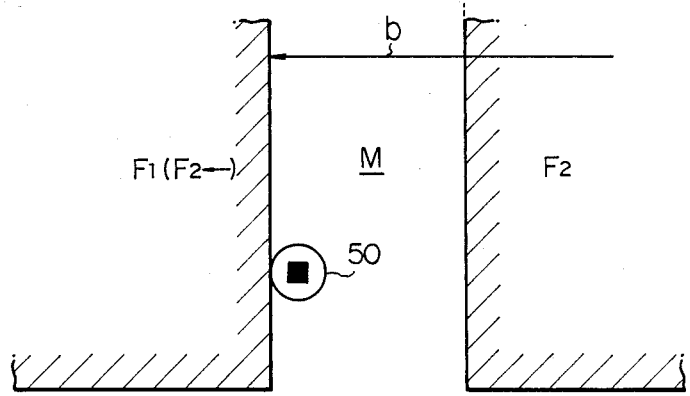

FIG. 15 shows a preferred routine program which may be predominant over the operation of the microfilm reader-printer apparatus. This routine program is started with the start switch on the control panel (not shown) depressed by the operator. It is, in this instance, assumed that, at the point of time when the reader-printer apparatus is thus started, the microfilm strip S which has been loaded into the apparatus has a position in which a beam of light passed through the margin area M between any two neighboring image frames of the microfilm strip S is incident on the margin sensor 50. Thus, the adjacent two image frames, represented by $F_1$ and $F_2$ in FIGS. 16A and 16B, may be located with respect to the margin sensor 50 either as indicated in FIG. 16A or as indicated in FIG. 16B. FIG. 16A shows the locations which the image frames $F_1$ and $F_2$ may have with respect to the margin sensor 50 at the end or beginning of a forward drive cycle of operation, while FIG. 16B shows the locations which the image frames $F_1$ and $F_2$ may have with respect to the margin sensor 50 at the end or beginning of a reverse drive cycle of operation. When the image frames $F_1$ and $F_2$ are thus located with respect to the margin sensor 50, the background/margin discriminate signal $S_{B/M}$ output from the comparator circuit 70 is of a logic "1" state indicating that a margin area M of the microfilm strip S is currently detected by the sensor 50.

When the start switch of the apparatus is depressed and the microprocessor unit 72 is switched in, it is first confirmed at step A01 whether or not there is present a request for feeding the microfilm strip S in reverse direction through a single image frame. Such a request may be entered from the "seesaw" switch provided on the control panel of the apparatus to enter a signal requesting the feeding of the microfilm strip S in either forward or reverse direction through a single image frame.

If it is found at the step A01 that there is present such a request entered from the control panel, there is established a reverse drive mode of operation as at step A02 and an instruction signal is issued from the microprocessor unit 72 to actuate the reverse drive motor 32 to start. Simultaneously when the reverse drive motor 32 is thus initiated into operation, an internal timer of the microprocessor unit 72 starts counting operation as at step A03. The time set by this internal timer corresponds to the distance of travel of the microfilm strip S to make a single step from an image frame to the immediately subsequent image frame. The reverse drive motor 32 is now actuated to start and drives the feed reel 20 for rotation to feed the microfilm strip S in the direction of arrow b from the takeup reel 22 to the feed reel 20. It may be noted that, before the microfilm strip S is thus driven for movement backwardly, the image frames $F_1$ and $F_2$ of the microfilm strip S will be located with respect to the margin sensor 50 as indicated in FIG. 16B.

As the microfilm strip S is driven for movement in the direction of arrow b, the image frame $F_1$ which has been held at the location detected by the margin sensor 50 is moved past the path of light toward the sensor 50 and, in turn, the image frame $F_2$ posterior to the image frame $F_1$ in the direction of travel of the microfilm strip S enters the path of light toward the sensor 50. When the subsequent image frame $F_2$ thus enters the path of light toward the margin sensor 50, the background/margin discriminate signal $S_{B/M}$ output from the comparator circuit 70 will swing from a logic "0" state to a logic "1" state. The internal timer of the microprocessor unit 72 remains operative until the signal $S_{B/M}$ shifts to the logic "1" state the so that, when it is detected at step A04 that the timer is over, it is tested at step A05 whether or not the background/margin discriminate signal $S_{B/M}$ from the comparator circuit 70 has been swung to the logic "0" state. When it is confirmed at step A05 that the signal $S_{B/M}$ is of the logic "0" state, it is determined that the trailing edge of the subsequent image frame $F_2$ has been detected and that the microfilm strip S has been moved the distance making a single step from the image frame $F_1$ to the subsequent image frame $F_2$ An instruction signal is now issued from the microprocessor unit 72 to bring the reverse drive motor 32 to a stop as at step A06.

If it is determined at the step A01 that there is no request for feeding the microfilm strip S in reverse direction through a single image frame, there is established a forward drive mode of operation as at step A07 and an instruction signal is issued from the microprocessor unit 72 to actuate the forward drive motor 34 to start. The forward drive motor 34 is now actuated to start and drives the takeup reel 22 for rotation to feed the microfilm strip S in the direction of arrow a from the feed reel 20 to the takeup reel 22. Simultaneously when the forward drive motor 32 is thus initiated into operation, the internal timer of the microprocessor unit 72 starts counting operation as at step A08. Before the microfilm strip S is thus driven for movement forwardly, the image frames $F_1$ and $F_2$ of the microfilm strip S will be located with respect to the margin sensor 50 as indicated in FIG. 16A.

As the microfilm strip S is driven for movement in the direction of arrow a, the image frame $F_2$ which has been held at the location detected by the margin sensor 50 is moved past the path of light toward the sensor 50 and, in turn, the image frame $F_1$ posterior to the image frame $F_2$ in the direction of travel of the microfilm strip S enters the path of light toward the sensor 50. When the subsequent image frame $F_1$ thus enters the path of light toward the margin sensor 50, the background/margin discriminate signal $S_{B/M}$ output from the comparator circuit 70 will swing from a logic "0" state to a logic "1" state. The internal timer of the microprocessor unit 72 remains operative until the signal $S_{B/M}$ shifts to the logic "1" state with the subsequent image frame $F_1$ moved into the path of light toward the sensor 50. When it is detected at step A09 that the timer is over, then it is tested at step A10 whether or not the signal $S_{B/M}$ from the comparator circuit 70 has been swung to the logic "0" state. When it is confirmed at step A10 that the signal $S_{B/M}$ is of the logic "0", it is determined that the trailing edge of the subsequent image frame $F_1$ has been detected and that the microfilm strip S has been moved the distance making a single step from the image frame $F_2$ to the image frame $F_1$. As such, an instruction signal is issued from the microprocessor unit 72 as at step A11 to bring the forward drive motor 34 to a stop.

The routine program hereinbefore described with reference to FIG. 15 will prove useful especially where the width of margin areas M is comparable to the coverage of the margin sensor 50. If the width of margin areas M is significantly larger than the coverage of the margin sensor 50, there may be produced an error d between the stop position of the subsequent image frame $F_1$ for forward drive operation and the stop position of the subsequent image frame $F_2$ for reverse drive operation. This is because of the fact that the location which the subsequent image frame $F_1$ is to have with respect to the sensor 50 at the end of a forward drive cycle of operation differs from the location which the subsequent image frame $F_2$ is to have with respect to the sensor 50 at the end of a forward drive cycle of operation.

Figure 17:
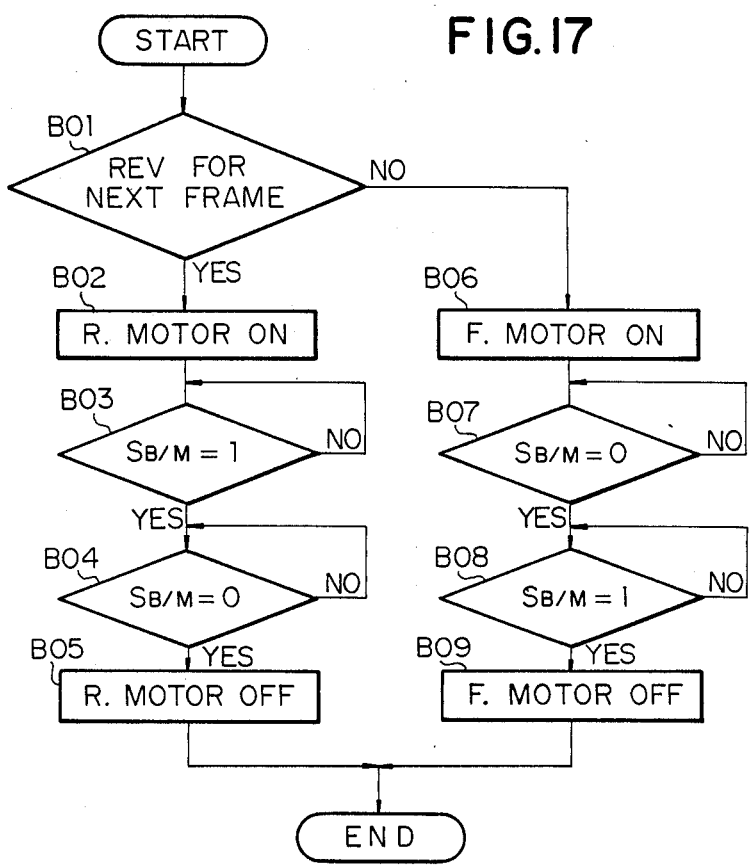
FIG. 17 is a flowchart showing another preferred routine pr which may be predominant over the operation of any of the embodiments of image projecting apparatus according to the present invention.
Figure 18A:
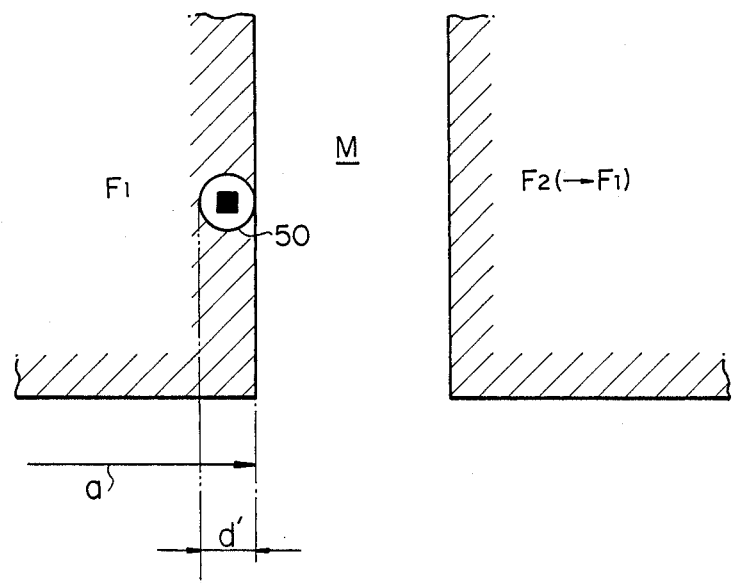
FIGS. 18A and 18B are fragmentary schematic views of the imaginary images which may be detected by the margin sensor, showing the locations which adjacent two image frames of a microfilm strip may have with respect to the margin sensor at the end or beginning of forward and reverse drive cycles of operation, respectively, when the routine program illustrated in FIG. 17 is executed.
Figure 18B:
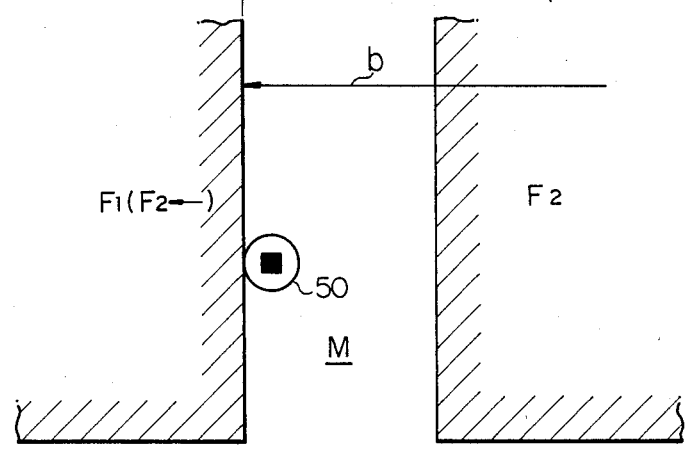

FIG. 17 shows a routine program which will eliminate such a drawback of the routine program hereinbefore described. In this instance, it is assumed that the adjacent two image frames, also represented by $F_1$ and $F_2$ in FIGS. 18A and 18B, may be located with respect to the margin sensor 50 either as indicated in FIG. 18A or as indicated in FIG. 18B. FIG. 18A is a fragmentary schematic view of the imaginary image which may be detected by the margin sensor and shows the locations which the image frames $F_1$ and $F_2$ may have with respect to the margin sensor 50 at the end or beginning of a forward drive cycle of operation, while FIG. 18B is a fragmentary schematic view of the imaginary image which may be detected by the margin sensor and shows the locations which the image frames $F_1$ and $F_2$ may have with respect to the margin sensor 50 at the end or beginning of a reverse drive cycle of operation.

When the start switch of the apparatus is depressed and the microprocessor unit 72 is switched in, it is first confirmed at step B01 whether or not there is present a request for feeding the microfilm strip S in reverse direction through a single image frame. If it is found at the step B01 that there is present such a request entered from the control panel, there is established a reverse drive mode of operation as at step B02 and an instruction signal is issued from the microprocessor unit 72 to actuate the reverse drive motor 32 to start. With the reverse drive motor 32 thus initiated into operation, it is tested at step B03 whether or not the background/margin discriminate signal $S_{B/M}$ from the comparator circuit 70 has been swung to the logic "1" state with the subsequent image frame $F_2$ moved into the path of light toward the sensor 50. When it is thereafter confirmed at step B04 that the signal $S_{B/M}$ is swung to the logic "0" state, it is determined that the trailing edge of the subsequent image frame $F_2$ has been detected and that the microfilm strip S has been moved the distance making a single step from the image frame $F_1$ to the subsequent image frame $F_2$. An instruction signal is now issued from the microprocessor unit 72 to bring the reverse drive motor 32 to a stop as at step B05.

If it is determined at the step B01 that there is no request for feeding the microfilm strip S in reverse direction through a single image frame, there is established a forward drive mode of operation as at step B06 and an instruction signal is issued from the microprocessor unit 72 to actuate the forward drive motor 34 to start. The forward drive motor 34 is now actuated to start and drives the takeup reel 22 for rotation to feed the microfilm strip S in the direction of arrow a from the feed reel 20 to the takeup reel 22. With the forward drive motor 34 thus initiated into operation, it is tested at step B03 whether or not the signal $S_{B/M}$ from the comparator circuit 70 has been swung to the logic "0" state. The signal $S_{B/M}$ of the logic "0" now indicates that the preceding image frame $F_2$ has been moved out of the path of light toward the sensor 50 and that the margin area M followed by the preceding image frame $F_2$ is moved into the path of light toward the sensor 50. When it is thereafter confirmed at step B08 that the signal $S_{B/M}$ is swung to the logic "1" state, it is determined that the the subsequent image frame $F_1$ is moved into the path of light toward the margin sensor 50 with the leading edge of the image frame $F_1$ detected and that the microfilm strip S has been moved the distance making a single step from the image frame $F_2$ to the subsequent image frame $F_1$. An instruction signal is now issued from the microprocessor unit 72 to bring the forward drive motor 34 to a stop as at step B09.

The routine program hereinbefore described with reference to FIG. 17 is characterized in that the reverse drive motor 32 is to be brought to a stop in response to transition of the signal $S_{B/M}$ from tee logic "1" state to logic "0" state and the forward drive motor 32 is to be brought to a stop in response to transition of the signal $S_{B/M}$ from the logic "0" state to logic "1" state. In other words, the motor 32 or the motor 34 is brought to a stop through such detection of the leading edge of the subsequent image frame $F_1$ (FIG. 18A) during forward drive operation or the trailing edge of the subsequent image frame $F_2$ during reverse drive operation. By the use of this mode of control, there may also be produced an error d' between the stop position of the subsequent image frame $F_1$ for forward drive operation and the stop position of the subsequent image frame $F_2$ for reverse drive operation. Such an error d' is substantially comparable to the coverage of the margin sensor 50 and would not invite any practical problem because of the fact that in view of the sufficiently small area of the photoelectric transducer element 54 ordinarily used for the sensor 50.

Figure 20:
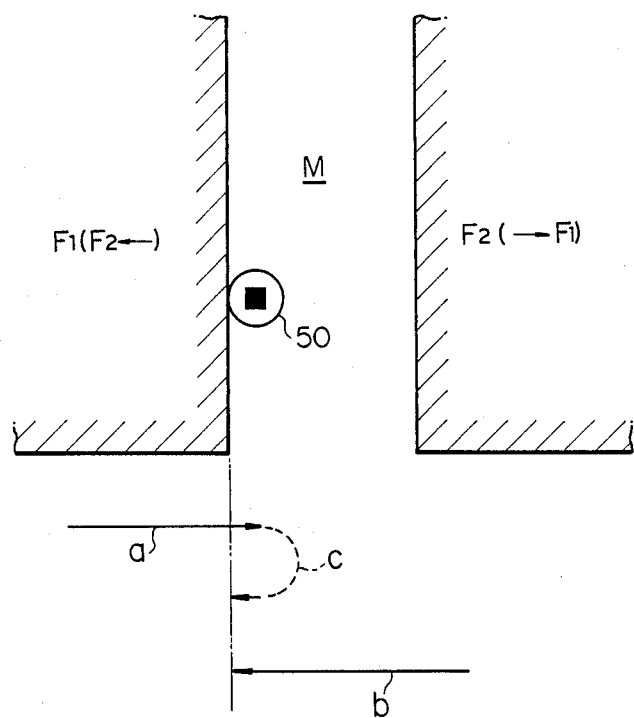
FIG. 20 is a fragmentary schematic view of the imaginary image which may be detected by the margin sensor, showing the locations which adjacent two image frames of a microfilm strip may have with respect to the margin sensor at the end or beginning of forward and reverse drive cycles of operation, respectively, when the routine program illustrated in FIG. 19 is executed.

FIG. 19 shows another preferred routine program which may be executed by the microprocessor unit 72 in the apparatus embodying the present invention. In this instance, it is assumed that the adjacent two image frames $F_1$ and $F_2$ is located with respect to the margin sensor 50 as indicated in FIG. 20 at the end or beginning of whichever of forward and reverse drive cycles of operation. FIG. 20 is a fragmentary schematic view of the imaginary image which may be detected by the margin sensor 50 and shows the locations which adjacent two image frames $F_1$ and $F_2$ of a microfilm strip may have with respect to the margin sensor 50 at the end or beginning of forward and reverse drive cycles of operation, respectively, when the routine program illustrated in FIG. 19 is executed.

When the start switch of the apparatus is depressed and the microprocessor unit 72 is switched in, it is first confirmed at step C01 whether or not there is present a request for feeding the microfilm strip S in reverse direction through a single image frame. If it is found at the step C01 that there is present such a request entered from the control panel, there is established a reverse drive mode of operation as at step C02 and an instruction signal is issued from the microprocessor unit 72 to actuate the reverse drive motor 32 to start. Simultaneously when the reverse drive motor 32 is thus initiated into operation, an internal timer of the microprocessor unit 72 starts counting operation as at step C03. The reverse drive motor 32 is now actuated to start and drives the feed reel 20 for rotation to feed the microfilm strip S in the direction of arrow b from the takeup reel 22 to the feed reel 20. It may be noted that, before the microfilm strip S is thus driven for movement backwardly, the image frames $F_1$ and $F_2$ of the microfilm strip S will be located with respect to the margin sensor 50 as indicated in FIG. 20.

As the microfilm strip S is driven for movement in the direction of arrow b, the image frame $F_1$ which has been held at the location detected by the margin sensor 50 is moved past the path of light toward the sensor 50 and, in turn, the image frame $F_2$ posterior to the image frame $F_1$ in the direction of travel of the microfilm strip S enters the path of light toward the sensor 50. When the subsequent image frame $F_2$ thus enters the path of light toward the margin sensor 50, the background/margin discriminate signal $S_{B/M}$ output from the comparator circuit 70 will swing from a logic "0" state to a logic "1" state. The internal timer of the microprocessor unit 72 remains operative until the signal $S_{B/M}$ shifts to the logic "1" state the so that, when it is detected at step C04 that the timer is over, it is tested at step C05 whether or not the background/margin discriminate signal $S_{B/M}$ from the comparator circuit 70 has been swung to the logic "0" state. When it is confirmed at step C05 that the signal $S_{B/M}$ is of the logic "0" state, it is determined that the trailing edge of the subsequent image frame $F_2$ has been detected and that the microfilm strip S has been moved the distance making a single step from the image frame $F_1$ to the subsequent image frame $F_2$. An instruction signal is now issued from the microprocessor unit 72 to bring the reverse drive motor 32 to a stop as at step C06.

If it is determined at the step C01 that there is no request for feeding the microfilm strip S in reverse direction through a single image frame, there is established a forward drive mode of operation as at step C07 and an instruction signal is issued from the microprocessor unit 72 to actuate the forward drive motor 34 to start. The forward drive motor 34 is now actuated to start and drives the takeup roller 20 for rotation to feed the microfilm strip S in the direction of arrow a from the the feed reel 20 to the takeup reel 22. Simultaneously when the forward drive motor 34 is thus initiated into operation, the internal timer of the microprocessor unit 72 starts counting operation as at step C08.

As the microfilm strip S is driven for movement in the direction of arrow a, the image frame $F_2$ which has been held at the location detected by the margin sensor 50 is moved past the path of light toward the sensor 50 and, in turn, the image frame $F_1$ posterior to the image frame $F_2$ in the direction of travel of the microfilm strip S enters the path of light toward the sensor 50. When the subsequent image frame $F_1$ thus enters the path of light toward the margin sensor 50, the background/margin discriminate signal $S_{B/M}$ output from the comparator circuit 70 will swing from a logic "0" state to a logic "1" state. The internal timer of the microprocessor unit 72 remains operative until the signal $S_{B/M}$ shifts to the logic "1" state with the subsequent image frame $F_1$ moved into the path of light toward the sensor 50. When it is detected at step C09 that the timer is over, then it is tested at step C10 whether or not the signal $S_{B/M}$ from the comparator circuit 70 has been swung to the logic "0" state. When it is confirmed at step C10 that the signal $S_{B/M}$ is of the logic "0", it is determined that the trailing edge of the preceding image frame $F_2$ has been detected and that the margin area M following the image frame $F_2$ has entered the path of light toward the sensor 50. Subsequently to the step C10, it is further queried at step C11 whether or not the signal $S_{B/M}$ is swung to the logic "1" state. When it is confirmed at step C11 that the signal $S_{B/M}$ is of the logic "1", it is determined that the leading edge of the subsequent image frame $F_1$ has been detected and that the image frame $F_1$ has entered the path of light toward the sensor 50. An instruction signal is now issued from the microprocessor unit 72 as at step C12 to bring the forward drive motor 34 to a stop and thereafter an instruction signal is issued as at step C13 to actuate the reverse drive motor 32 to drive the microfilm strip S for movement backwardly as indicated by arrow c in FIG. 20 until it is found at step C14 that the signal $S_{B/M}$ is swung from the logic "1" back to the logic "0" state. With the transition of the signal $S_{B/M}$ from the logic "1" back to the logic "0" state, it is determined that the leading edge of the subsequent image frame $F_1$ is located in the path of light toward the sensor 50. An instruction signal is now issued from the microprocessor unit 72 as at step C15 to bring the reverse drive motor 32 to a stop.

The routine program hereinbefore described with reference to FIG. 19 is characterized in that, whether the microfilm strip S has been driven to travel forwardly or backwardly, the microfilm strip S is driven to travel in a predetermined direction such as the reverse direction b before the microfilm strip S is brought to a stop.

Figure 21:
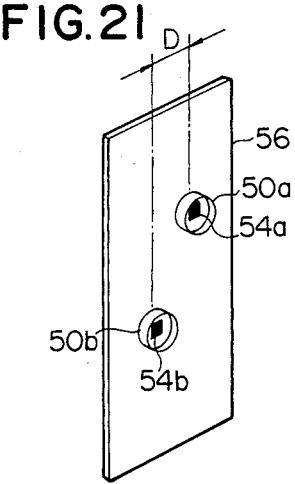
FIG. 21 is a perspective view showing a modified form of margin detect means which may be used to execute a fourth preferred routine program which may be executed in an image projecting apparatus according to the present invention.

While the margin detect means of each of the embodiments of an image projecting apparatus according to the present invention as thus far been described consists of a single margin sensor, two or even more margin sensors may be used. As shown in FIG. 21, such margin detect means may have two margin sensors consisting of first and second margin sensors 50a and 50b. These first and second margin sensors 50a and 50b comprises respective photoelectric transducer elements 54a and 54b and are mounted on a common support plate 56. The margin sensors 50a and 50b are spaced apart a predetermined distance D from each other in a direction parallel with the direction of travel of the microfilm strip S. The margin sensors 50a and 50b are further spaced apart a predetermined distance from each other in a direction perpendicular to the direction of travel of the microfilm strip S. Furthermore, the margin sensors 50a and 50b are located so that, when one of the sensors 50a and 50b is located to be responsive to a beam of light from the margin area of adjacent two image frames of a microfilm strip, the other sensor is located to be responsive to a beam of light from one of the two image frames.

Each of the margin sensors 50a and 50b is adapted to produce the signal $S_D$ in response to the information-carrying beam of light from the image frame and supplies the signal $S_D$ to a comparator circuit for comparison with a reference signal $S_T$ representative of the predetermined threshold level $L_T$ similarly to the margin sensor 50 described with reference to FIG. 6. In response to the signal $S_D$ from the first margin sensor 50a, the associated comparator circuit produces a logic "0" or "1" background/margin discriminate signal $S_{B/Ma}$ depending on the relationship of the input signal $S_D$ to the level $L_B$ or level $L_M$ indicated in FIG. 5B. Likewise, the comparator circuit associated with the second margin sensor 50b produces, in response to the signal $S_D$ from the second margin sensor 50b, a logic "0" or "1" background/margin discriminate signal $S_{B/Mb}$ depending on the relationship of the input signal $S_D$ to the level $L_B$ or level $L_M$ indicated in FIG. 5B. If desired, each of the margin sensors 50a and 50b may be provided with the shield member 58 as in the apparatus described with reference to FIG. 2.

Figure 22:
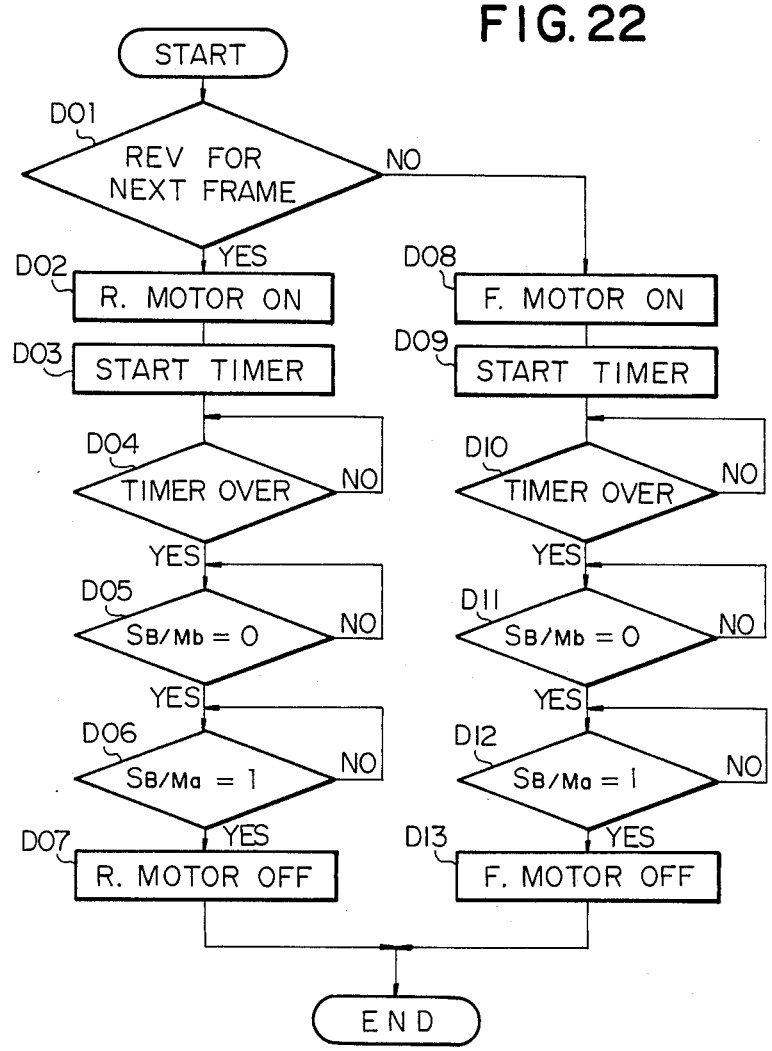
FIG. 22 a flowchart showing the fourth preferred routine program to be executed with use of the margin detect means illustrated in FIG. 21.
Figure 23:
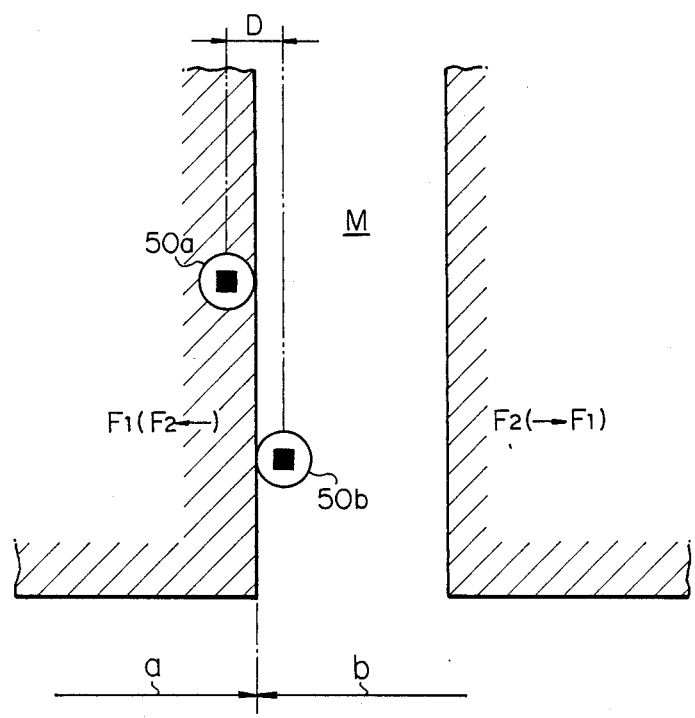
FIG. 23 a fragmentary schematic view of the imaginary image whixh may be detected by the margin sensor, showing the locations which adjacent two image frames of a microfilm strip may have with respect to the margin sensor at the end or beginning of forward and reverse drive cycles of operation, respectively, when the routine program illustrated in FIG. 22 is executed.

FIG. 22 shows a preferred routine program which may be executed by the microprocessor unit 72 in a microfilm reader-printer apparatus using these two margin sensors 50a and 50b. In this instance, it is assumed that the adjacent two image frames $F_1$ and $F_2$ is located with respect to the first and second margin sensor 50a and 50b as indicated in FIG. 23 at the end or beginning of whichever of forward and reverse drive cycles of operation. FIG. 23 is a fragmentary schematic view of the imaginary image which may be detected by the margin sensor 50 and shows the locations which adjacent two image frames $F_1$ and $F_2$ of a microfilm strip may have with respect to the margin sensor 50 at the end or beginning of forward and reverse drive cycles of operation, respectively, when the routine program illustrated in FIG. 19 is executed.

When the start switch of the apparatus is depressed and the microprocessor unit 72 is switched in, it is first confirmed at step D01 whether or not there is present a request for feeding the microfilm strip S in reverse direction through a single image frame. If it is found at the step D01 that there is present such a request entered from the control panel, there is established a reverse drive mode of operation as at step D02 and an instruction signal is issued from the microprocessor unit 72 to actuate the reverse drive motor 32 to start. Simultaneously when the reverse drive motor 32 is thus initiated into operation, an internal timer of the microprocessor unit 72 starts counting operation as at step D03. The time set by this internal timer corresponds to the distance of travel of the microfilm strip S to make a single step from an image frame to the immediately subsequent image frame. The reverse drive motor 32 is now actuated to start and drives the feed reel 20 for rotation to feed the microfilm strip S in the direction of arrow b from the takeup reel 22 to the feed reel 20. It may be noted that, before the microfilm strip S is thus driven for movement backwardly, the image frames $F_1$ and $F_2$ of the microfilm strip S will be located with respect to the first and second margin sensors 50a and 50b as indicated in FIG. 23.

As the microfilm strip S is driven for movement in the direction of arrow b, the image frame $F_1$ which has been held at the location detected by the margin sensor 50a is moved past the path of light toward the first sensor 50a. When the preceding image frame $F_1$ is thus moved out of the path of light toward the margin sensor 50a, the background/margin discriminate signal $S_{B/Ma}$ output from the comparator circuit associated with the sensor 50a will swing from a logic "1" state to a logic "0" state. The internal timer of the microprocessor unit 72 remains operative until the signals $S_{B/Ma}$ and $S_{B/Mb}$ from the two margin sensors 50a and 50b shift to the logic "1" states so that, when it is detected at step D04 that the timer is over, it is tested at step D05 whether or not the background/margin discriminate signal $S_{B/Mb}$ from the comparator circuit associated with the second margin sensor 50b has been swung to the logic "0" state. When it is confirmed at step D05 that the signal $S_{B/Mb}$ is of the logic "0" state, it is determined that the trailing edge of the subsequent image frame $F_2$ has been detected. At this point of time, the first margin sensor 50a still remains responsive to the subsequent image frame $F_2$ so that the comparator circuit associated with the first margin sensor 50a is producing a background/margin discriminate signal $S_{B/Ma}$ of a logic "1" state.

It is then tested at step D06 whether or not the background/margin discriminate signal $S_{B/Ma}$ from the comparator circuit associated with the first margin sensor 50a has been swung to the logic "1" state. When it is confirmed at step D06 that the signal $S_{B/Ma}$ is of the logic "1" state, it is determined that the microfilm strip S has been moved the distance making a single step from the image frame $F_1$ to the subsequent image frame $F_2$, an instruction signal is issued from the microprocessor unit 72 to bring the reverse drive motor 32 to a stop as at step D07.

If it is determined at the step D01 that there is no request for feeding the microfilm strip S in reverse direction through a single image frame, there is established a forward drive mode of operation as at step D08 and an instruction signal is issued from the microprocessor unit 72 to actuate the forward drive motor 34 to start. The forward drive motor 34 is now actuated to start and drives the takeup reel 22 for rotation to feed the microfilm strip S in the direction of arrow a from the the feed reel 20 to the takeup reel 22. Simultaneously when the forward drive motor 32 is thus initiated into operation, the internal timer of the microprocessor unit 72 starts counting operation as at step D09.

As the microfilm strip S is driven for movement in the direction of arrow a, the image frame $F_2$ enters the path of light toward the second margin sensor 50b. When the subsequent image frame $F_2$ is thus moved into the path of light toward the margin sensor 50b, the background/margin discriminate signal $S_{B/Mb}$ output from the comparator circuit associated with the sensor 50b will swing from the logic "0" state to the logic "1" state. The internal timer of the microprocessor unit 72 remains operative until the signals $S_{B/Ma}$ and $S_{B/Mb}$ from the two margin sensors 50a and 50b shift to the logic "0" states so that, when it is detected at step D10 that the timer is over, it is tested at step D11 whether or not the background/margin discriminate signal $S_{B/Mb}$ from the comparator circuit associated with the second margin sensor 50b has been swung to the logic "0" state. When it is confirmed at step D11 that the signal $S_{B/Mb}$ is of the logic "0" state, it is determined that the margin area M between the two image frames $F_1$ and $F_2$ have been detected.

The subsequent image frame $F_1$ will be then moved into the path of light toward the first margin sensor 50a. It is then tested at step D12 whether or not the background/margin discriminate signal $S_{B/Ma}$ from the comparator circuit associated with the first margin sensor 50a has been swung to the logic "1" state. When it is confirmed at step D12 that the signal $S_{B/Ma}$ is of the logic "1" state, it is determined that the leading edge of the subsequent image frame $F_1$ has been detected. It is now determined that the microfilm strip S has been moved the distance making a single step from the image frame $F_2$ to the subsequent image frame $F_1$ so that an instruction signal is issued from the microprocessor unit 72 as at step D13 to bring the forward drive motor 34 to a stop.

The routine program hereinbefore described with reference to FIG. 23 is also useful for eliminating or at least significantly reducing the error between the stop position of the subsequent image frame $F_1$ for forward drive operation and the stop position of the subsequent image frame $F_2$ for reverse drive operation.

Figure 24:
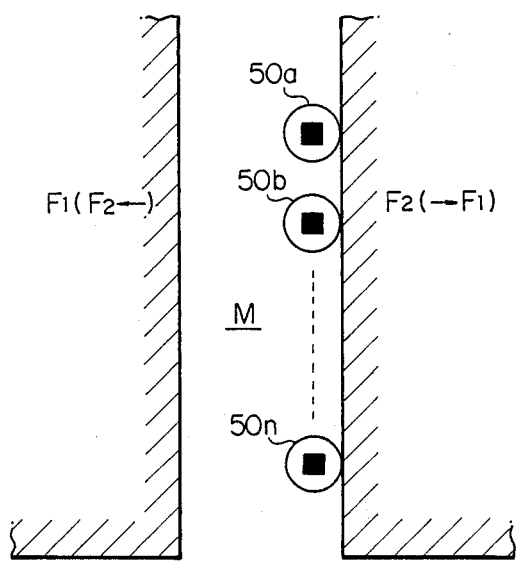
FIG. 24 is a fragmentary schematic view of the imaginary image which may be detected by the margin sensor, showing the locations which adjacent two image frames of a microfilm strip may have with respect to a plurality of margin sensors at the end or beginning of forward and reverse drive cycles of operation, respectively, in an image projecting apparatus according to the present invention in which the margin detect means is composed of such a plurality of margin sensors.
Figure 25:
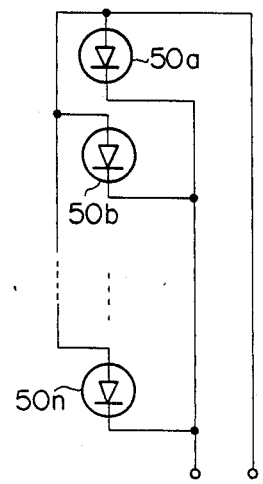
FIG. 25 is a circuit diagram showing an example of the circuit arrangement including the margin sensors illustrated in FIG. 24.

Each of the routine programs to be executed in an image projecting apparatus according to the present invention as hereinbefore described with reference to FIGS. 15, 17 and 19 may be modified to use two or more margin sensors. In this instance, such a plurality of margin sensors, indicated at 50a, 50b, ... 50n in FIG. 24, may be arranged in a linear array perpendicular to the direction of travel of the microfilm strip S. FIG. 24 is a fragmentary schematic view of the imaginary image which may be detected by the margin sensors 50a, 50b,... 50n and shows the locations which adjacent two image frames $F_1$ and $F_2$ of a microfilm strip may have with respect to the margin sensors 50a, 50b, ... 50n at the end or beginning of forward and reverse drive cycles of operation, respectively, when the routine program illustrated in FIG. 19 is executed. Where margin detect means using the linear array of the margin sensors 50a, 50b, ... 50n is incorporated in an image projecting apparatus according to the present invention, it may be determined that a margin area is currently detected if a margin area is detected by at least one of the margin sensors 50a, 50b, ... 50n. The margin sensors 50a, 50b, ... 50n may be electrically connected in parallel as indicated in FIG. 25 for connection to an appropriate comparator network (not shown).

Furthermore, it has been assumed that a request for feeding of a microfilm strip in forward or reverse direction through a single image frame is entered from the "seesaw" switch provided on the control panel of the apparatus. Arrangements may however be made so that a request can be entered for feeding of a microfilm strip in forward or reverse direction through a desired number of image frames. Such a request may be entered from the numerical switches which may be also provided on the control panel of the apparatus. In this instance, the desired image frame may be retrieved through counting of the time for which the microfilm strip has been fed by the forward drive or reverse drive motor 32 or 34 or by means of the microprocessor unit 72 which may be arranged to count the transitions of the background/margin discriminate signal $S_{B/M}$.

What is claimed is:

1. An image projecting apparatus using a microfilm strip as an image-carrying medium carrying a series of image frames which have a margin area between adjacent two thereof, comprising
   (a) a viewing screen for displaying an image reproduced from said microfilm strip,
   (b) drive means for driving said microfilm strip to travel along a predetermined path,
   (c) means for irradiating said microfilm strip with a beam of light, the beam of light being transmitted as an information-carrying beam of light carrying image information detected from said microfilm strip,
   (d) a projection lens for magnifying said information-carrying light beam and projecting the magnified beam of light onto said viewing screen,
   (e) photoelectric transducer means responsive to at least a portion of said information-carrying light beam for producing an electric signal variable with the quantity of light incident on the photoelectric transducer means, said photoelectric transducer means being located off the location at which said information-carrying light beam is to be focussed by said projection lens, and
   (f) control means responsive to the electrical signal from said photoelectric transducer means for detecting the margin area intervening between any adjacent two of the image frames of said microfilm strip and thereby controlling said drive means.

2. An image projecting apparatus as set forth in claim 1, further comprising light-dispersive reflector means located on a path of light between said projection lens and said photoelectric transducer means for dispersing the beam of light from said projection lens and directing the dispersed light toward said photoelectric transducer means.

3. An image projecting apparatus as set forth in claim 1, further comprising light-dispersive light transmitting means located on a path of light between said projection lens and said photoelectric transducer means for dispersing the beam of light from said projection lens and passing the dispersed light toward said photoelectric transducer means.

4. An image projecting apparatus as set forth in claim 1, in which said drive means comprises
   (1) a supply reel having a cylindrical surface on which said microfilm strip to be wound in the form of a roll,
   (2) a takeup reel having a cylindrical surface on which the microfilm strip supplied from said supply reel is to be wound in the form of a roll,
   (3) a first drive motor operative to drive said supply reel for rotation in a direction in which said microfilm strip is to be wound on the cylindrical surface thereof, and
   (4) a second drive motor operative to drive said takeup reel for rotation in a direction in which said microfilm strip is to be wound on the cylindrical surface thereof.

5. An image projecting apparatus using a microfilm strip as an image-carrying medium carrying a series of image frames which have a margin area between adjacent two thereof, comprising
   (a) a viewing screen for displaying an image reproduced from said microfilm strip,
   (b) drive means for driving said microfilm strip to travel along a predetermined path,
   (c) means for irradiating said microfilm strip with a beam of light, the beam of light being transmitted as an information-carrying beam of light carrying image information detected from said microfilm strip,
   (d) a projection lens for magnifying said information-carrying light beam and projecting the magnified beam of light onto said viewing screen,
   (e) photoelectric transducer means responsive to at least a portion of said information-carrying light beam for producing an electric signal variable with the quantity of light incident on the photoelectric transducer means,
   (f) light conducting means for directing said information-carrying light beam from said projection lens to said photoelectric transducer means, said light conducting means comprising light-dispersive reflector means for dispersing the beam of light from said projection lens and directing the dispersed light toward said photoelectric transducer means, and
   (g) control means responsive to the electric signal from said photoelectric transducer means for detecting the margin area intervening between any adjacent two of the image frames of said microfilm strip and thereby controlling said drive means.

6. An image projecting apparatus as set forth in claim 5, in which said photoelectric transducer means is located on a plane substantially coincident with the plane of said viewing screen onto which the information-carrying light beam is to be incident.

7. An image projecting apparatus as set forth in claim 5, in which said drive means comprises
   (1) a supply reel having a cylindrical surface on which said microfilm strip to be wound in the form of a roll,
   (2) a takeup reel having a cylindrical surface on which the microfilm strip supplied from said supply reel is to be wound in the form of a roll,
   (3) a first drive motor operative to drive said supply reel for rotation in a direction in which said microfilm strip is to be wound on the cylindrical surface thereof, and
   (4) a second drive motor operative to drive said takeup reel for rotation in a direction in which said microfilm strip is to be wound on the cylindrical surface thereof.

8. An image projecting apparatus using a microfilm strip as an image-carrying medium carrying a series of image frames which have a margin area between adjacent two thereof, comprising
   (a) a viewing screen for displaying an image reproduced from said microfilm strip,
   (b) drive means for driving said microfilm strip to travel along a predetermined path,
   (c) means for irradiating said microfilm strip with a beam of light, the beam of light being transmitted as an information-carrying beam of light carrying image information detected from said microfilm strip, (d) a projection lens for magnifying said information carrying light beam and projecting the magnified beam of light onto said viewing screen, (e) photoelectric transducer means responsive to at least a portion of said information-carrying light beam for producing an electric signal variable with the quantity of light incident on the photoelectric transducer means, (f) light conducting means for directing said information-carrying light beam from said projection lens to said photoelectric transducer means, said light conducting means comprising light-dispersive light transmitting means for dispersing the beam of light from said projection lens and passing the dispersed light toward said photoelectric transducer means, and (g) control means responsive to the electric signal from said photoelectric transducer means for detecting the margin area intervening between any adjacent two of the image frames of said microfilm strip and thereby controlling said drive means.

9. An image projecting apparatus as set forth in claim 8, in which said photoelectric transducer means is located on a plane substantially coincident with the plane of said viewing screen onto which the information-carrying light beam is to be incident.

10. An image projecting apparatus as set forth in claim 8, in which said drive means comprises
(1) a supply reel having a cylindrical surface on which said microfilm strip to be wound in the form of a roll,
(2) a takeup reel having a cylindrical surface on which the microfilm strip supplied from said supply reel is to be wound in the form of a roll,
(3) a first drive motor operative to drive said supply reel for rotation in a direction in which said microfilm strip is to be wound on the cylindrical surface thereof, and
(4) a second drive motor operative to drive said takeup reel for rotation in a direction in which said microfilm strip is to be wound on the cylindrical surface thereof.

11. An image projecting apparatus using a microfilm strip as an image-carrying medium carrying a series of image frames which have a margin area between adjacent two thereof, comprising
(a) a viewing screen for displaying an image reproduced from said microfilm strip,
(b) drive means for driving said microfilm strip to travel along a predetermined path,
(c) means for irradiating said microfilm strip with a beam of light, the beam of light being transmitted as an information carrying beam of light carrying image information detected from said microfilm strip, (d) a projection lens for magnifying said information-carrying light beam and projecting the magnified beam of light onto said viewing screen, (e) photoelectric transducer means responsive to at least a portion of said information-carrying light beam for producing an electric signal variable with the quantity of light incident on the photoelectric transducer means, (f) light conducting means for directing said information-carrying light beam from said projection lens to said photoelectric transducer means, said light conducting means comprising beam-converging light transmitting means for converging the beam of light for said projection lens and passing the converged light toward said photoelectric transducer means, and (g) control means responsive to the electric signal from said photoelectric transducer means for detecting the margin area intervening between any adjacent two of the image frames of said microfilm strip and thereby controlling said drive means.

12. An image projecting apparatus as set forth in claim 11, in which said photoelectric transducer means is located on a plane substantially coincident with the plane of said viewing screen onto which the information-carrying light beam is to be incident.

13. An image projecting apparatus as set forth in claim 11, in which said drive means comprises
(1) a supply reel having a cylindrical surface on which said microfilm strip to be wound in the form of a roll,
(2) a takeup reel having a cylindrical surface on which the microfilm strip supplied from said supply reel is to be wound in the form of a roll,
(3) a first drive motor operative to drive said supply reel for rotation in a direction in which said microfilm strip is to be wound on the cylindrical surface thereof, and
(4) a second drive motor operative to drive said takeup reel for rotation in a direction in which said microfilm strip is to be wound on the cylindrical surface thereof.

14. An image projecting apparatus as set forth in any one of claims 1, 5 and 8, in which said photoelectric transducer means is located so that the distance between the photoelectric transducer means and the microfilm strip along the path of light from the microfilm strip to the photoelectric transducer means is more than about 3 per cent smaller or larger than the total distance which light is to travel from the microfilm strip to said viewing screen.

* * * * *